(12) United States Patent
Laugen et al.

(10) Patent No.: US 12,096,718 B2
(45) Date of Patent: Sep. 24, 2024

(54) CONTROLLABLE END DIVIDERS

(71) Applicant: Deere & Company, Moline, IL (US)

(72) Inventors: Heather G. Laugen, Davenport, IA (US); Nathan E. Krehbiel, Bettendorf, IA (US); Steve A. Coon, Long Grove, IA (US); Troy M. Heims, Davenport, IA (US); Curtis R. Hammer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 717 days.

(21) Appl. No.: 17/332,127

(22) Filed: May 27, 2021

(65) Prior Publication Data

US 2022/0377978 A1    Dec. 1, 2022

(51) Int. Cl.
*A01D 41/14*      (2006.01)

(52) U.S. Cl.
CPC ......... *A01D 41/141* (2013.01); *A01D 41/144* (2013.01)

(58) Field of Classification Search
CPC .. A01D 41/141; A01D 41/144; A01D 45/021; A01D 63/00
See application file for complete search history.

(56) References Cited

U.S. PATENT DOCUMENTS

| | | | |
|---|---|---|---|
| 4,193,250 A | 3/1980 | Kessens et al. | |
| 10,462,969 B2 | 11/2019 | Benes et al. | |
| 10,694,654 B2 | 6/2020 | Walker et al. | |
| 2008/0177449 A1* | 7/2008 | Pickett | A01D 41/141 701/50 |
| 2015/0101300 A1* | 4/2015 | Pierson | A01D 41/141 56/10.2 E |
| 2015/0121831 A1* | 5/2015 | Noll | A01D 63/04 56/249 |
| 2019/0045710 A1 | 2/2019 | Benes et al. | |
| 2022/0225569 A1* | 7/2022 | Zielke | A01D 45/021 |

FOREIGN PATENT DOCUMENTS

| | | |
|---|---|---|
| BR | 102014027449 A2 | 8/2016 |
| EP | 3603379 A1 | 2/2020 |
| JP | 2002051627 A | 2/2002 |
| WO | 2020077203 A1 | 4/2020 |
| WO | 2020097229 A1 | 5/2020 |

OTHER PUBLICATIONS

Extended European Search Report and Written Opinion issued in European Patent Application No. 22171905.7, dated Oct. 27, 2022, in 07 pages.

* cited by examiner

*Primary Examiner* — Richard M Camby
(74) *Attorney, Agent, or Firm* — Kelly, Holt & Christenson; Joseph R. Kelly

(57) ABSTRACT

An agricultural system includes a corn head with an end divider and an actuator that moves the end divider between a raised position and a retracted position. An actuator controller receives an input and automatically controls the actuator to move the end divider to a position based upon the input.

4 Claims, 24 Drawing Sheets

CONTROLLABLE END DIVIDERS

FIELD OF THE DESCRIPTION

The present description relates to controlling agricultural harvesters. More specifically, the present description relates to controlling end dividers on a head of an agricultural harvester.

BACKGROUND

There are several different types of agricultural harvesters. One type of agricultural harvester is a combine harvester which can have different heads attached to harvest different types of crops.

In one example, a corn head can be attached to the combine harvester in order to harvest corn. A corn head may have row dividers and gathering chains. The row dividers help to divide the rows of corn and the gathering chains pull the corn stalks into a set of snap rolls that separate the ears of the corn plant from the stalks. The ears are then moved by an auger toward the center of the corn head where the ears enter the feeder house of the combine harvester. The ears are then further processed within the combine harvester to remove the kernels of corn from the cobs.

During a harvesting operation, after the ears of corn are separated from the stalk, the ears can bounce around on the head and can bounce off of the head onto the field and be lost. In order to address this type of loss, some corn heads have end dividers on the ends of the corn head. The end dividers can be raised manually to inhibit ear loss over the sides of the corn head. The end dividers can also be lowered manually.

The discussion above is merely provided for general background information and is not intended to be used as an aid in determining the scope of the claimed subject matter.

SUMMARY

An agricultural system includes a corn head with an end divider and an actuator that drives movement of the end divider between a raised or extended position and a lowered or retracted position. An actuator controller receives an input and automatically controls the actuator to move the end divider to a position based upon the input.

Example 1 is an agricultural system comprising:
a head configured to be mounted to an agricultural harvester,
a first end divider, movable between a retracted position and a raised position, on a first end of the head;
a first actuator, mounted on the head, that moves the first end divider between the retracted position and the raised position;
an input mechanism that detects an end divider position criterion;
an actuator controller that identifies a control action, corresponding to the first end divider, to take based on the detected end divider position criterion; and
a control signal generation system that automatically generates a control signal to control the first actuator to move the first end divider to a commanded position based on the identified control action.

Example 2 is the agricultural system of any or all previous examples, wherein the input mechanism comprises:
an operator interface mechanism in an operator compartment of the agricultural harvester, the operator interface mechanism being configured to detect, as the end divider position criterion, an operator input command.

Example 3 is the agricultural system of any or all previous examples, wherein the input mechanism comprises:
a sensor configured to detect the end divider position criterion and generate a criterion signal based on the detected end divider position criterion, and
wherein the actuator controller comprises a sensor signal processing system configured to process the criterion signal to identify a commanded end divider position.

Example 4 is the agricultural system of any or all previous examples, wherein the control signal generation system comprises:
a control action identification system configured to identify, as a part of the control action, an identified end divider, of the first and second end dividers, that corresponds to the commanded end divider position and whether to raise or lower the identified end divider based on the commanded end divider position.

Example 5 is the agricultural system of any or all previous examples, wherein the sensor comprises an ear loss sensor configured to sense, as the end divider position criterion, crop ears that are lost over the first end of the header and generate, as the criterion signal, an ear loss signal, and
wherein the sensor signal processing system comprises an ear loss signal processor configured to identify, as the commanded end divider position, a raised end divider position.

Example 6 is the agricultural system of any or all previous examples, wherein the sensor comprises a terrain detector configured to detect, as the end divider position criterion, a terrain feature of terrain proximate the agricultural harvester and generate, as the criterion signal, a terrain signal indicative of the terrain feature, and
wherein the sensor signal processing system comprises a terrain signal processor configured to identify, as the commanded end divider position, an end divider position based on the terrain signal.

Example 7 is the agricultural system of any or all previous examples, wherein the sensor comprises a road mode/field mode detector configured to detect, as the end divider position criterion, whether the agricultural harvester is in a road mode or a field mode and generate, as the criterion signal, a mode signal indicative of whether the agricultural harvester is in the road mode or the field mode, and
wherein the sensor signal processing system comprises a road mode/field mode signal processor configured to identify, as the commanded end divider position, an end divider position based on the mode signal.

Example 8 is the agricultural system of any or all previous examples, wherein the sensor comprises an adjacent pass crop state detector configured to detect, as the end divider position criterion, whether crop adjacent the first end of the head is unharvested or harvested and generate, as the criterion signal, a crop state signal indicative of whether the crop adjacent the first end of the head is unharvested or harvested, and
wherein the sensor signal processing system comprises a harvested/unharvested signal processor configured to identify, as the commanded end divider position, a raised end divider position if the crop state signal indicates that the crop adjacent the first end of the head is harvested and a lowered end divider position if the crop state signal indicates that the crop adjacent the first end of the head is unharvested.

Example 9 is the agricultural system of any or all previous examples, wherein the sensor comprises a heading detector configured to detect, as the end divider position criterion, a direction of travel of the agricultural harvester and generate, as the criterion signal, a direction of travel signal indicative of the direction of travel of the agricultural harvester, and wherein the sensor signal processing system comprises a direction of travel processor configured to identify, as the commanded end divider position, an end divider position based on the direction of travel signal.

Example 10 is the agricultural system of any or all previous examples, wherein the sensor comprises a geographic position sensor configured to detect, as a first end divider position criterion, a geographic position of the agricultural harvester and generate, as the criterion signal, a position signal based on the geographic position of the agricultural harvester, the sensor further comprising a map input mechanism configured to detect on a map, as a second end divider position criterion, a map feature and generate, as the criterion signal, a map feature signal indicative of the map feature, and wherein the sensor signal processing system comprises a map processor configured to identify, as the commanded end divider position, an end divider position based on the position signal and the map feature signal.

Example 11 is the agricultural system of any or all previous examples and further comprising:

a second end divider, movable between a retracted position and a raised position, on a second end of the head; and a second actuator that moves the second end divider between the retracted position and the raised position, wherein the actuator controller identifies a second end divider control action, corresponding to the second end divider, to take based on the detected end divider position criterion, and wherein the control signal generation system automatically generates a control signal to control the second actuator to move the second end divider to a second end divider commanded position based on the identified second end divider control action.

Example 12 is a method of controlling an end divider on a head of an agricultural harvester, the method comprising:

detecting an end divider position criterion corresponding to a first end divider on a first end of the head, the first end divider movable between a retracted position and a raised position;

identifying a control action, corresponding to the first end divider, to take based on the detected end divider position criterion; and automatically generating a control signal to control a first actuator to move the first end divider to a commanded position based on the identified control action.

Example 13 is the method of any or all previous examples, wherein detecting an end divider position criterion comprises detecting, as the end divider position criterion, an operator input command on an operator interface mechanism in an operator compartment of the agricultural harvester.

Example 14 is the method of any or all previous examples, wherein detecting an end divider position criterion comprises:

detecting, with a detector, the end divider position criterion; and generating a criterion signal based on the detected end divider position criterion, and wherein identifying a control action comprises:

processing the criterion signal to identify a commanded end divider position; and automatically identifying the control action based on the commanded end divider position.

Example 15 is the method of claim 14, wherein detecting an end divider position criterion comprises:

detecting, as the end divider position criterion, crop ears that are lost over the first end of the header, and generating, as the criterion signal, an ear loss signal, and wherein identifying a control action comprises:

processing the ear loss signal to identify, as the commanded end divider position, a raised end divider position; and automatically identifying the control action based on the raised end divider position.

Example 16 is the method of any or all previous examples, wherein detecting an end divider position criterion comprises:

detecting, as the end divider position criterion, a terrain feature of terrain proximate the agricultural harvester, and generating, as the criterion signal, a terrain signal indicative of the terrain feature and wherein identifying a control action comprises:

processing the terrain signal to identify, as the commanded end divider position, a terrain-based end divider position based on the terrain signal; and automatically identifying the control action based on the terrain-based end divider position.

Example 17 is the method of any or all previous examples, wherein detecting an end divider position criterion comprises:

detecting, as the end divider position criterion, whether the agricultural harvester is in a road mode or a field mode; and generating, as the criterion signal, a mode signal indicative of whether the agricultural harvester is in the road mode or the field mode, and wherein identifying a control action comprises:

processing the mode signal to identify, as the commanded end divider position, an end divider position based on the mode signal; and automatically identifying the control action based on the commanded end divider position.

Example 18 is the method of any or all previous examples, wherein detecting an end divider position criterion comprises:

detecting, as the end divider position criterion, whether crop adjacent the first end of the head is unharvested or harvested; and generating, as the criterion signal, a crop state signal indicative of whether the crop adjacent the first end of the head is unharvested or harvested, and wherein identifying a control action comprises:

processing the crop state signal to identify, as the commanded end divider position, a raised end divider position if the crop state signal indicates that the crop adjacent the first end of the head is harvested and a lowered end divider position if the crop state signal indicates that the crop adjacent the first end of the head is unharvested; and automatically identifying the control action based on the commanded end divider position.

Example 19 is the method of any or all previous examples, wherein detecting an end divider position criterion comprises:

detecting, as the end divider position criterion, a geographic position of the agricultural harvester, and generating, a position signal based on the geographic position of the agricultural harvester, wherein detecting an end divider position criterion further comprises:

detecting on a map, as a second end divider position criterion, a map feature; and generating, a map feature signal indicative of the map feature, and wherein identifying a control action comprises:

processing the map feature signal and the position signal to identify an end divider position based on the position signal and the map feature signal.

Example 20 is an agricultural system comprising:

a head configured to be mounted on an agricultural harvester, a first end divider, movable between a retracted position and a raised position, on a first end of the head;

a first actuator, mounted on the head, that moves the first end divider between the retracted position and the raised position;

an input mechanism that detects an end divider position criterion;

one or more processors; and memory storing computer executable instructions that, when executed by the one or more processors, cause the one or more processors to perform steps comprising:

identifying a control action, corresponding to the first end divider, to take based on the detected end divider position criterion; and automatically generating a control signal to control the first actuator to move the first end divider to a commanded position based on the identified control action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
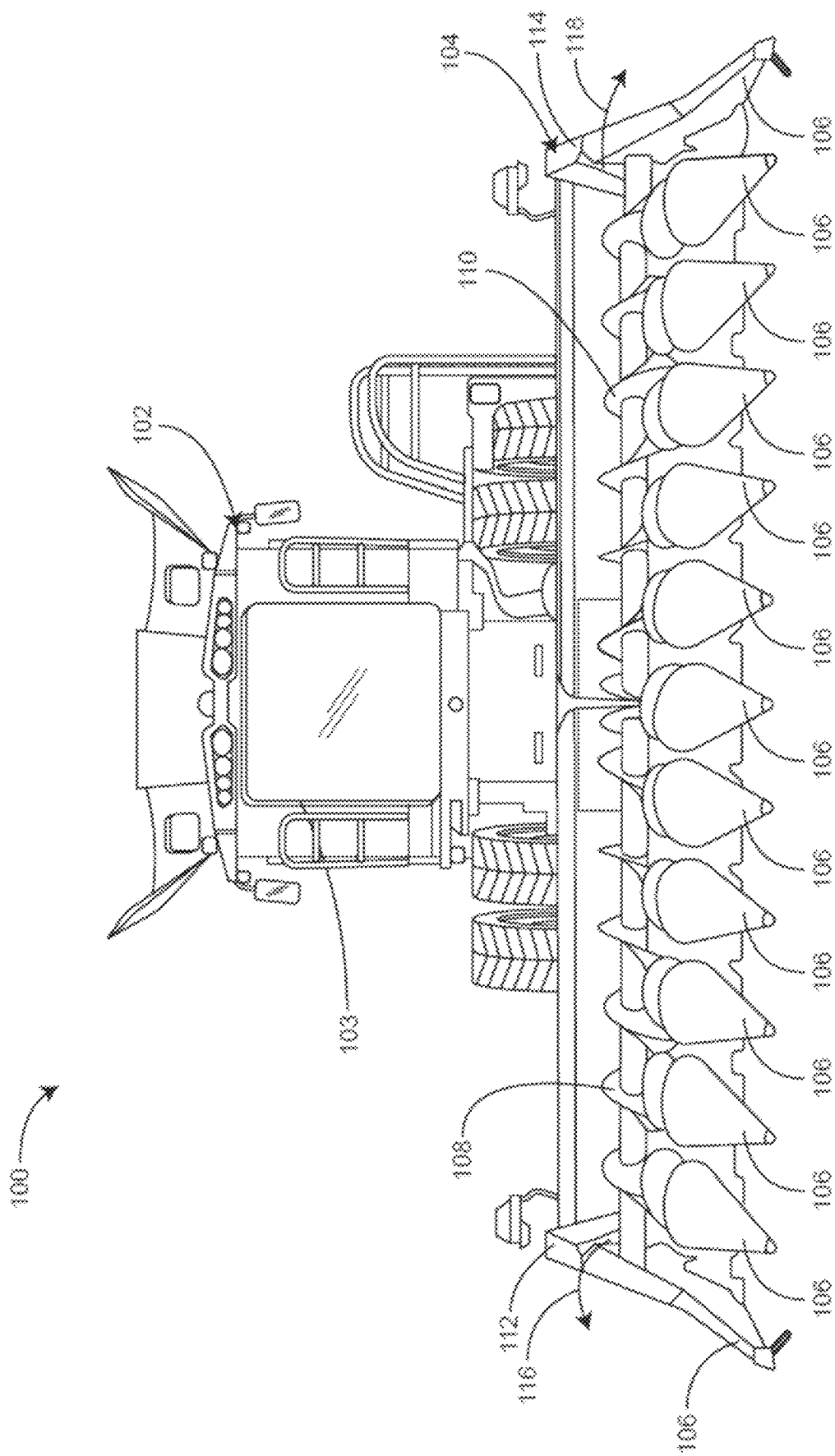
FIG. 1 is a pictorial illustration of a combine harvester with a rigid corn head attached.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

FIG. 1 is a pictorial illustration of one example of an agricultural harvester 100. Agricultural harvester 100 includes combine harvester 102 and head 104. Combine harvester 102 includes an operator's compartment 103 that has operator interface mechanisms that can be used by an operator to control combine harvester 102 and head 104. Some examples of operator interface mechanisms are described below.

Head 104 is a rigid head, meaning that head 104 is not foldable. Head 104 has a plurality of row dividers 106 and augers 108 and 110. Row dividers 106 separate the corn rows as agricultural harvester 100 moves through a field. The stalks are guided between row dividers 106 where gathering chains move the stalks into a set of snap rolls that remove the ears from the stalks. The ears are then moved toward a central portion of head 104 by augers 108 and 110, where the ears enter a feeder house, which feeds the ears into the combine harvester 102 for further processing.

As discussed above, after the ears are separated from the stalks, the ears can bounce around on head 104 and bounce over the end 112 of head 104 in the direction indicated by arrow 116. The ears can also bounce over end 114 of head 104 in the direction indicated by arrow 118. If the ears bounce over either end 112 or end 114, the ears fall to the ground and are lost.

Figure 2:
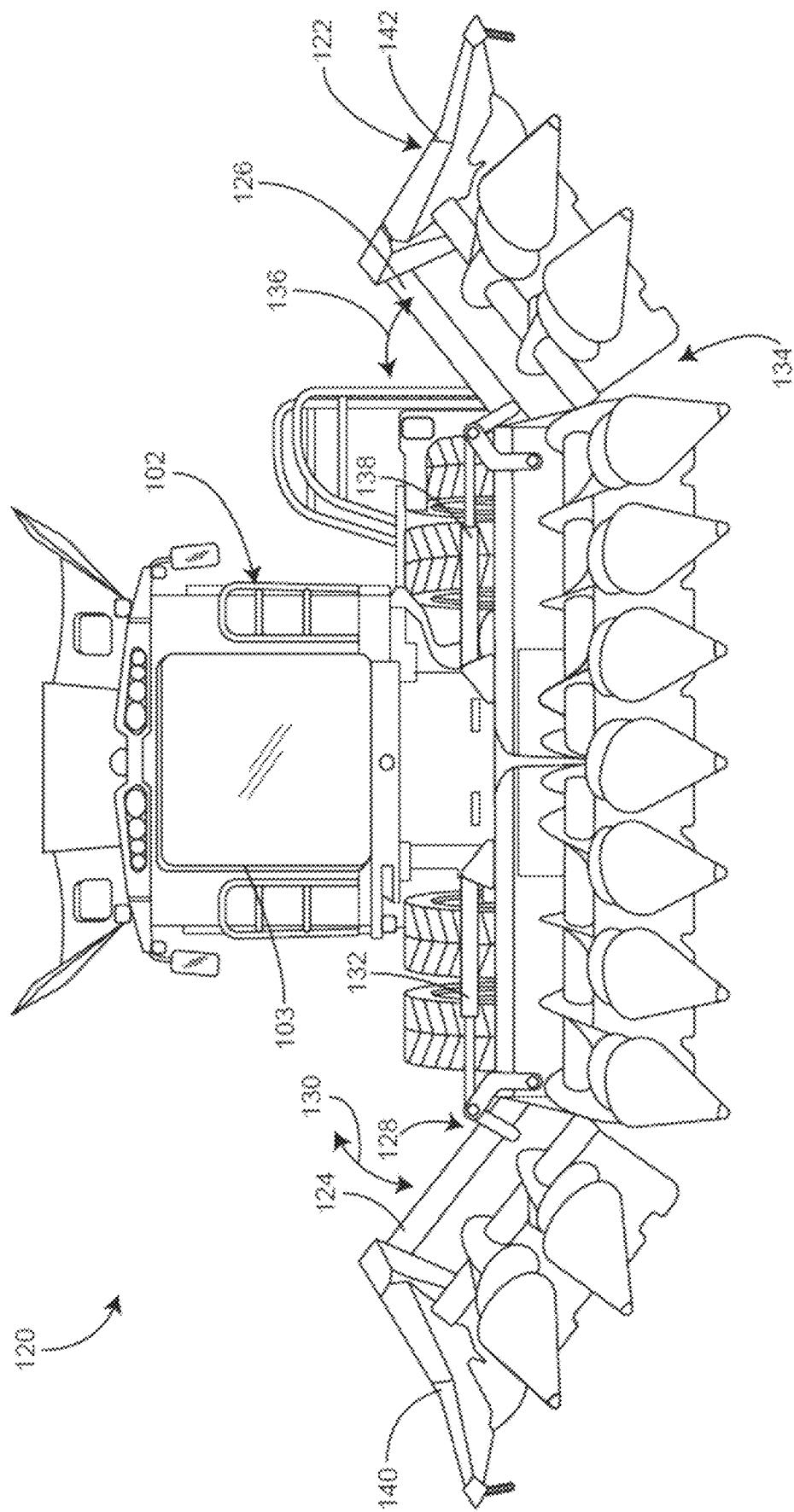
FIG. 2 is a pictorial illustration of a combine harvester with a foldable corn head attached.

FIG. 2 is a pictorial illustration of another example of an agricultural harvester 120. Agricultural harvester 120 includes combine harvester 102 attached to a head 122. In the example shown in FIG. 2, head 122 is a foldable corn head. Therefore, the head 122 includes opposite end sections 124 and 126 which can be moved between a deployed position and a folded position. In one example, end portion 124 is foldable about a pivot 128. End portion 124 folds about pivot 128 in the direction indicated by arrow 130. The movement of end portion 124 is driven by an actuator 132 which, in the example shown in FIG. 2, is illustrated as a hydraulic actuator. End portion 126 can be moved between a deployed position and a folded position. Similarly, end portion 126 can rotate about pivot 134 generally in the direction indicated by arrow 136. The movement of end portion 126 can be driven by actuator 138. In the example shown in FIG. 2, actuator 138 is a hydraulic actuator.

Head 122 has opposite ends 140 and 142. Once ears of corn are separated from the stalks by the head 122 shown in FIG. 2, the ears can bounce around on head 122 and bounce over the ends 140 or 142 and thus be lost.

Figure 3:
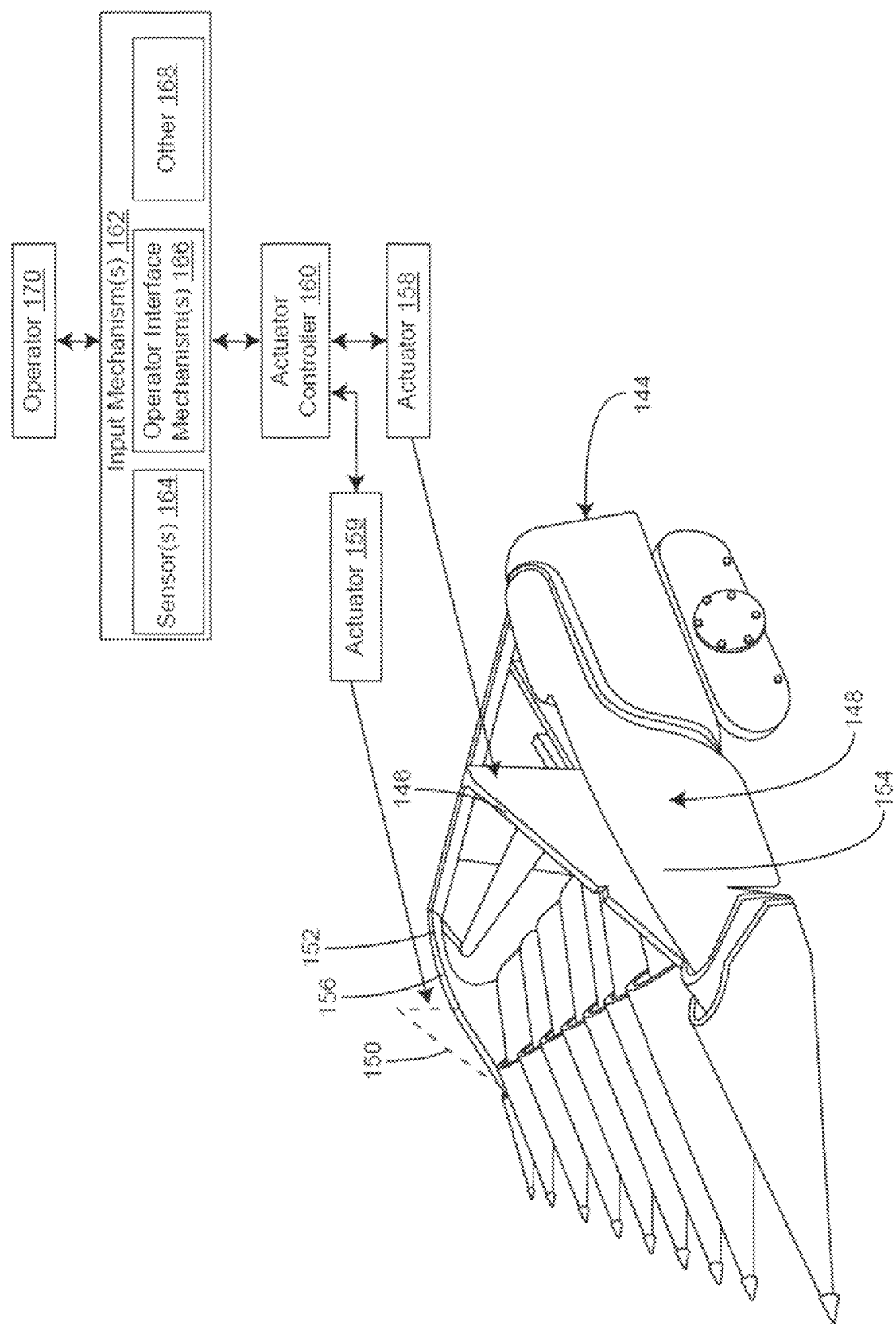
FIG. 3 is a perspective view of a corn head and a block diagram of a portion of an agricultural system.

FIG. 3 shows another view of a head 144. In order to address the problem of ears of corn being lost over the ends of head 144, head 144 is fitted with a first end divider 146 disposed at a first end 148 of head 144. Head 144 also has a second end divider 150 (shown in phantom in FIG. 2) disposed at a second end 152 of head 144. End dividers 146 and 150 are movable between a retracted position, and a raised position. In the example shown in FIG. 3, end divider 146 is shown in the raised position and end divider 150 is shown in phantom in the raised position. When end divider 146 is in the retracted position, end divider 146 is retracted within a housing 154. When end divider 150 is in the retraced position, end divider 150 is retracted within a housing 156.

In some current systems, end dividers 146 and 150 are manually movable between the raised position and the retracted position. Therefore, in order to change the position of an end divider 146 or 150, the operator of the agricultural harvester 100 or 120 must exit the operator compartment 103 in order to effectuate a positional change of the end dividers 146 and 150. For instance, if the operator wishes to lower end divider 146 to the retracted position, the operator must exit the operator compartment 103 and manually lower end divider 146 into its retracted position. Similarly, if the operator then wishes to raise end divider 146, the operator, in current systems, must exit operator compartment 103 and manually raise end divider 146. Similarly, in current systems, the end dividers 146 and 150 are only positionable between the fully retracted position in which the end divider is fully retracted, and the fully raised position in which the end divider is fully raised.

The present description thus proceeds with respect to a system in which the end dividers 146 and 150 are automatically movable between the fully retracted position and the fully raised position. In some examples, positions of the end dividers 146 and 150 are selectable to any of a plurality of different positions between the fully retracted position and the fully raised position. Also, in some examples, the end dividers 146 and 150 are movable to a position based upon an operator input, such as an operator input made from within the operator compartment 103 of the combine harvester 102. Also, in some examples, the position of the end dividers 146 and 150 is automatically controlled based upon sensor inputs, operator inputs, or other inputs.

Referring again to FIG. 3, end divider 146 is moveable between the retracted position and the raised position by an actuator 158. End divider 150 is moveable between the retracted position and the raised position by an actuator 159. Example actuators within the scope of actuators 158 and 159 include a linear actuator, a rotary actuator, a hydraulic actuator, an electric actuator, or a pneumatic actuator. In other implementations, the actuator 158 or 159 may be another type of actuator.

An actuator controller 160 generates control signals to control actuator 158 and actuator 159 based upon inputs from one or more input mechanisms 162. Input mechanisms 162 may include one or more sensors 164, one or more operator interface mechanisms 166, and one or more other input mechanisms 168. The operator interface mechanism 166 may be one or more of pedals, levers, joysticks, a steering wheel, buttons, switches, keypads, keyboards, a point and click device, a touch sensitive display device, an actuator displayed on a user interface, a speaker, speech synthesis and speech recognition functionality, and other audible, visible and haptic operator input and output devices. An operator 170 may therefore provide an input through operator interface mechanisms 166 to command end divider 146, or end divider 150, or both end dividers 146 and 150, to move to a desired position. The operator input mechanisms 166 may detect the command from operator 170 and provide an indication of the command to actuator controller 160. Actuator controller 160 generates control signals to control actuator 158 to control the position of end divider 146 in response to the provided command indication. Similarly, actuator 160 generates control signals to control actuator 159 to control the position of end divider 150 based on the command from operator 170. In some examples, actuator controller 160 generates separate control signals for each of the actuators 158 and 159. Consequently, in some instances, actuator 158 and actuator 159 are independently controllable relative to one another. Therefore, in some implementations, the position of end divider 146 is independently controllable relative to the position of end divider 150.

Also, in some examples, sensors 164 include a plurality of different sensors that generate sensor signals. The sensor signals are used by actuator controller 160 to automatically generate control signals to control actuator 158 and actuator 159 to thereby control the position of end divider 146 and end divider 150 based upon the sensor signals. Some examples of different types of sensor signals that are within the scope of signals generated by sensors 164 and used by actuator controller 160 to generate control signals to control actuator 158 and actuator 159 are discussed in greater detail below.

Figure 4:
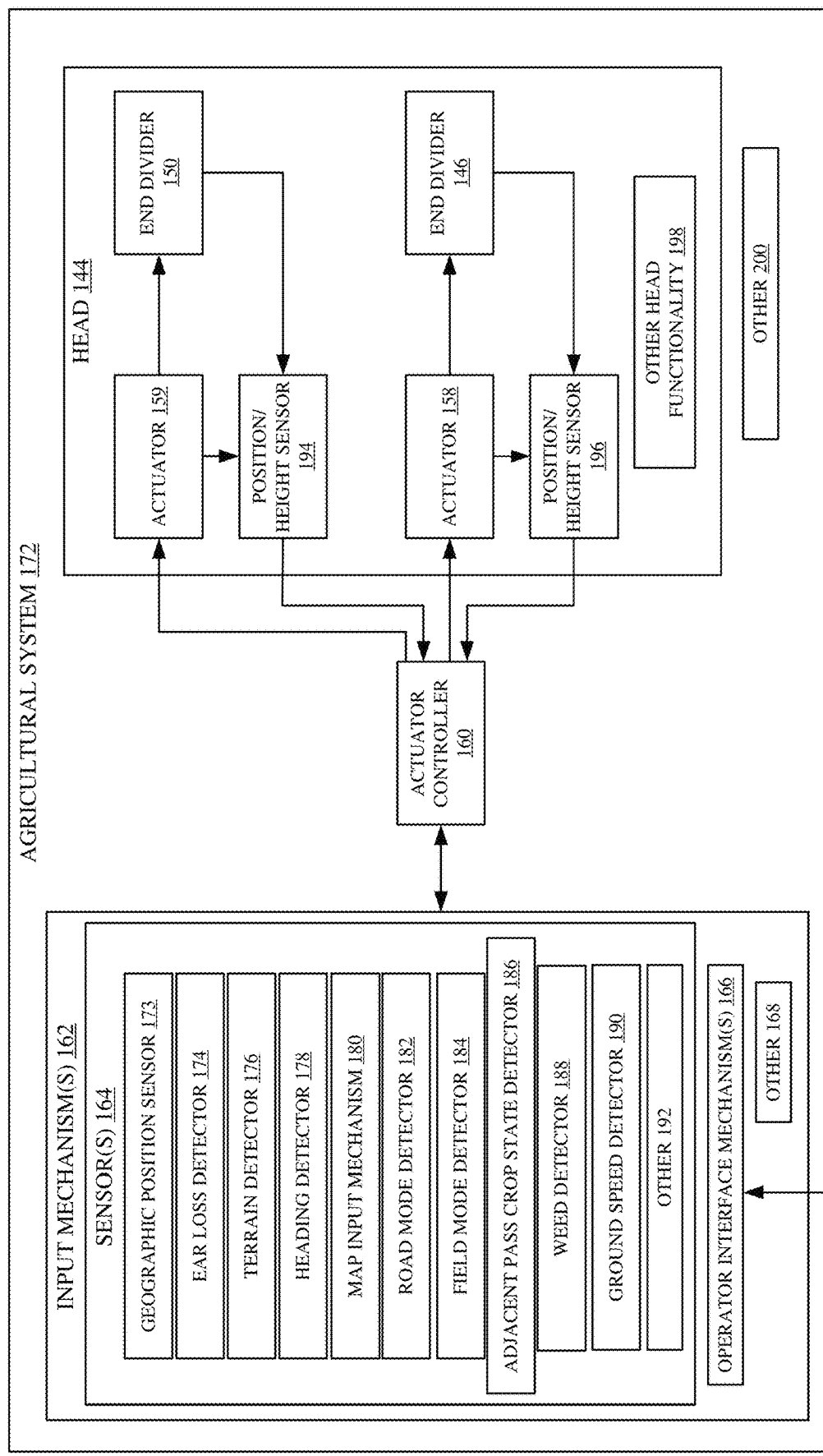
FIG. 4 is a block diagram showing one example of an agricultural system.

FIG. 4 is a block diagram of one example of an agricultural system 172. Some of the items in agricultural system 172 are similar to those shown in FIG. 3 and are similarly numbered in FIG. 4. It will be noted that different input mechanisms 162 may be located in different places on agricultural harvester 100, 120. For instance, in some implementations, some of the input mechanisms 162 are located on the head while others are located in the operator compartment. In some instances, other input mechanisms 162 are located on combine harvester 102, but external to the operator compartment 103. In some implementation, the functionality of actuator controller 160 is located on the head used by agricultural harvester 100, 120 or on the combine harvester 102 or elsewhere. In still other implementations, the functionality of actuator controller 160 is divided between combine harvester 102 and the head used by the agricultural harvester 100, 120.

In FIG. 4, sensors 164 include geographic position sensor 173, ear loss detector 174, terrain detector 176, heading detector 178, map input mechanism 180, road mode detector 182, field mode detector 184, adjacent pass crop state detector 186, weed detector 188, ground speed detector 190, and other items 192. FIG. 4 also shows that the example head 144 includes position/height sensor 194 and position/height sensor 196 as well as other head functionality 198. Position/height sensor 194 senses the position or height of end divider 150 relative to its fully retracted position or relative to its fully raised position. Therefore, position/height sensor 194 is a senor that senses the position of end divider 150, itself, or that senses the position of actuator 159. By way of example, if actuator 159 is a linear actuator such as a hydraulic cylinder, then position/height sensor 194 may be a Hall Effect sensor or another type of sensor that can sense the position of actuator 159 so that the position of end divider 150 can be determined based upon the position of actuator 159. In another example, assume that end divider 150 moves between its retracted position and its raised position by rotating about a pivot point. In that case, position/height sensor 194 may be a rotary sensor that senses an amount by which end divider 150 is rotated about the pivot point so that the position of end divider 150 relative to the retracted position of end divider 150 or relative to the raised position of end divider 150 is determinable. Position/height sensor 196 may operate in the same way as position/height sensor 194 or in a different way. Also, it will be noted that, while head 144 is shown as a rigid head, head 144 could just as easily be a foldable head such as head 122 shown in FIG. 2. When the head is a foldable head 122, then the other head functionality 198 includes actuators 132 and 138. FIG. 4 shows that agricultural system 172 may also include other items 200.

Some of the sensors 164 will now be described by way of example only. Geographic position sensor 173 senses a position of agricultural harvester 100, 120. Geographic position sensor 173 may be a global navigation satellite system (GNSS) receiver, a cellular triangulation sensor, or another type of sensor that senses the position of agricultural harvester 100, 120 in a global or local coordinate system.

Ear loss detector 174 illustratively detects ear loss over the sides 148 and 152 of head 144. Ear loss detector 174 includes optical detectors, such as an image capture device (e.g., a camera) that captures one or more images of an area proximate the ends 148 and 152 of head 144. In some implementations, the ear loss detector 174 also includes image processing systems, such as an image processing system that processes the one or more captured images to identify any ears that are lost over the ends 148 and 152 of head 144. In some implementations, ear loss detector 174 includes, for example, mechanical detectors, such as deflectable fingers that extend above the ends 148 and 152 of head 144 and are deflected by ears traveling over the top of head 144. In still other implementations, ear loss detector 174 can be or include another type of detector as well. Ear loss detector 174 generates a signal indicative of detected ear loss.

The terrain detector 176 detects the terrain over which agricultural harvester 100, 120 is traveling, the terrain of ahead of agricultural harvester 100, 120 in the direction of travel, or both. Therefore, in some instances, terrain detector 176 includes, for example, one or more accelerometers, one or more inertial measurement units, an optical sensor that senses the slope of the terrain in front of agricultural harvester 100, 120, or any of a variety of other terrain detectors. Terrain detector 176 generates a signal indicative of the terrain.

Heading detector 178 detects the heading of agricultural harvester 100, 120. In some implementations, heading detector 178 includes, for example, a GNSS receiver that detects a current location of agricultural harvester 100, 120. Two measurements can be taken from the GNSS receiver to determine a direction of travel of agricultural harvester 100. In some instances, heading detector 178 includes, for example, a compass or other heading detector that detects the heading of agricultural harvester 100, 120. Heading detector 178 generates a signal indicative of the heading.

In some implementations, map input mechanism 180 is a computer system through which one or more different maps can be downloaded and stored or otherwise accessed by agricultural system 172. In some implementations, map input mechanism 180 is an interactive computer system that can obtain or access maps that are stored in a remote location. Map input mechanism 180 generates a signal indicative of information on the map.

Road mode detector 182 detects when agricultural harvester 100, 120 is in, or is changing to, a road mode in which agricultural harvester 100, 120 is about to travel out of a field. Road mode detector 182 may detect that agricultural harvester 100, 120 is in road mode by detecting that agricultural harvester 100, 120 is on a road, is no longer in a field, or is about to leave a field. Road mode detector 182 may take a variety of different forms. For instance, in some implementations, road mode detector 182 receives an input from a geographic position sensor 173 to identify a current position of agricultural harvester 100, 120. Road mode detector 182 compares that geographic position against a map that is downloaded or received by map input mechanism 180 to determine where agricultural harvester 100, 120 is located on the map. The fields on the map and the roads on the map are identified beforehand or identified during runtime processing. Therefore, road mode detector 182 determines whether agricultural harvester 100, 120 is in a field or at a location other than a field, such as on a road. In some implementations, if agricultural harvester 100, 120 is on a road (or at a location other than a field), then road mode detector 182 detects that agricultural harvester 100, 120 is in road mode. In another example, road mode detector 182 receives an input indicative of the ground speed of agricultural harvester 100, 120. If the ground speed of agricultural harvester 100, 120 exceeds a threshold level, this may indicate that agricultural harvester 100, 120 is in road mode. In such an instance, the road mode detector 182 interprets a speed in excess of a threshold level as an indication that agricultural harvester 100, 120 is traveling along a road and, thus, in road mode. Further, in some implementations where head 144 is a foldable head 144, road mode detector 182 detects the position of the foldable portions 124 and 126 or the position of actuators 132 and 138 to determine whether the head 144 is in the deployed position, is in the folded position, or is being moved from the deployed position to the folded position. When the head is in the folded position or is being moved to the folded position, this indicates that agricultural harvester 100, 120 is in the road mode or is about to be placed in the road mode. In some instances, road mode detector 182 also detects an operator input through an operator interface mechanism 166 to determine whether agricultural harvester 100, 120 is in the road mode. For instance, operator 170 may depress a button or actuate another operator input mechanism such as any of the operator interface mechanisms 166 to place agricultural harvester 100, 120 in the road mode. The operator input is detected by road mode detector 182 to determine whether agricultural harvester 100, 120 is in road mode. Road mode detector 182 generates a signal indicative of whether agricultural harvester 100, 120 in in road mode.

Field mode detector 184 may detect whether agricultural harvester 100, 120 is in the field mode. Detecting that agricultural harvester 100, 120 is in the field mode when agricultural harvester 100, 120 is in a field and is configured to perform a harvesting operation or is performing a harvesting operation. For instance, field mode detector 184 detects whether the crop processing mechanisms in combine harvester 102, 120 are operating (such as whether threshing and separating mechanisms are operating, whether the gathering chain and rotors 108 and 110 on the head 144 are operating, among other things). For example, if the crop processing mechanisms are operating, then field mode detector 184 detects that agricultural harvester 100, 120 is in the field mode. In some implementations, field mode detector 184 compares a current geographic location of agricultural harvester 100, 120 against a map to determine whether agricultural harvester 100, 120 is in a field or in an area other than a field (such as on a road). Field mode detector 184 determines that, if agricultural harvester 100, 120 is in a field, agricultural harvester 100, 120 is in field mode. In some instances, field mode detector 184 receives an operator input through operator interface mechanisms 166 indicating that operator 170 has placed the agricultural harvester 100, 120 in field mode. Field mode detector 184 generates a signal indicative of whether agricultural harvester 100, 120 is in field mode.

Adjacent pass crop state detector 186 detects whether crops in the field adjacent the current position of agricultural harvester 100, 120 have been harvested or are still unharvested. For instance, adjacent pass crop state detector 186 can determine whether the crops in the area of the field immediately adjacent the left-hand side of head 144 has been harvested as well as whether the crops in the field immediately adjacent the right-hand side of head 144 have been harvested. Adjacent pass crop state detector 186 can thus include a processor that processes a harvest map that maps where crops in a field have already been harvested. Based upon the harvested locations on the harvest map, and the current location of agricultural harvester 100, 120, adjacent pass crop state detector 186 may generate an output indicating whether the crops have been harvested adjacent the sides of head 144. Adjacent pass crop state detector 186 may also include an image capture device, such as a camera, along with an image processing computer system that receives images captured by the image capture device and processes those images to identify items in the images, such as crop stalks, standing crops, harvested crops, or other items. Images of the field adjacent the sides of head 144 can be captured and image processing can be performed to determine whether crop is still standing or has been harvested. Adjacent pass crop state detector 186 can detect whether the crop adjacent the sides of head 144 have been harvested in other ways as well.

Weed detector 188 detects the intensity of weeds. Without limitation, weed intensity may include at least one of weed presence, weed population, weed growth stage, weed biomass, weed moisture, weed density, a height of weeds, a size of a weed plant, an age of weeds, or health condition of weeds at a location within an area. The measure of weed intensity may be a binary value (such as weed presence or weed absence), or a continuous value (such as a percentage of weeds in a defined area or volume) or a set of discrete values (such as low, medium, or high weed intensity values).

A vegetative index map illustratively maps vegetative index values (which may be indicative of vegetative growth) across different geographic locations in a field of interest. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants. Without limitations, these bands may be in the microwave, infrared, visible, or ultraviolet portions of the electromagnetic spectrum.

In some implementations, a vegetative index map is used to identify the presence and location of vegetation. In some examples, these maps enable weeds to be identified and georeferenced in the presence of bare soil, crop residue, or other plants, including crop or other weeds. For instance, at the end of a growing season, when a crop is mature, the crop plants may show a reduced level of live, growing vegetation. However, weeds often persist in a growing state after the maturity of the crop. Therefore, if a vegetative index map is generated relatively late in the growing season, the vegetative index map may be indicative of the location of weeds in the field. In some instances, though, the vegetative index map may be less useful (or not at all useful) in identifying an intensity of weeds in a weed patch or the types of weeds in a weed patch. Thus, in some instances, a vegetative index map may have a reduced usefulness in predicting how to control an agricultural harvester as the agricultural harvester moves through the field.

Weed detector 188 may, thus, include an image capture device that captures images of the field immediately forward of agricultural harvester 100, 120, along with an image processing system that processes the image to identify the intensity of weeds. Weed detector 188 may also include a map accessing system that obtains vegetative index values from a vegetative index map, such as an NDVI map, along with the current location of agricultural harvester 100, 120, to determine the intensity of weeds. Weed detector 188 can include other weed detectors as well.

Ground speed detector 190 may detect the ground speed of agricultural harvester 100, 120. Ground speed detector 190 may thus be a sensor that senses the rotational speed of an axel or another sensor that generates an output indicative of the ground speed of agricultural harvester 100, 120.

Operator interface mechanisms 166 may include a wide variety of different operator interface mechanisms that can be used to provide information to operator 170 and receive inputs from operator 170. Therefore, operator interface mechanisms 166 include, for example, a steering wheel, one or more joysticks, buttons, levers, linkages, pedals, or an operator interface display screen that generates displays for operator 170. An operator interface display screen may also display a graphical user interface with operator actuatable mechanisms (such as links, buttons, icons, etc.) that can be actuated by operator 170 to provide an input to agricultural system 172. The operator actuatable mechanisms can be actuated using a point and click device, such as a mouse or trackball, or by a touch gesture where the operator interface display mechanism is a touch sensitive display screen. The operator interface mechanisms 166 may include a microphone and speaker where speech recognition and speech synthesis are provided. The operator interface mechanisms 166 may also include other audio, visual, or haptic devices.

Figure 5:
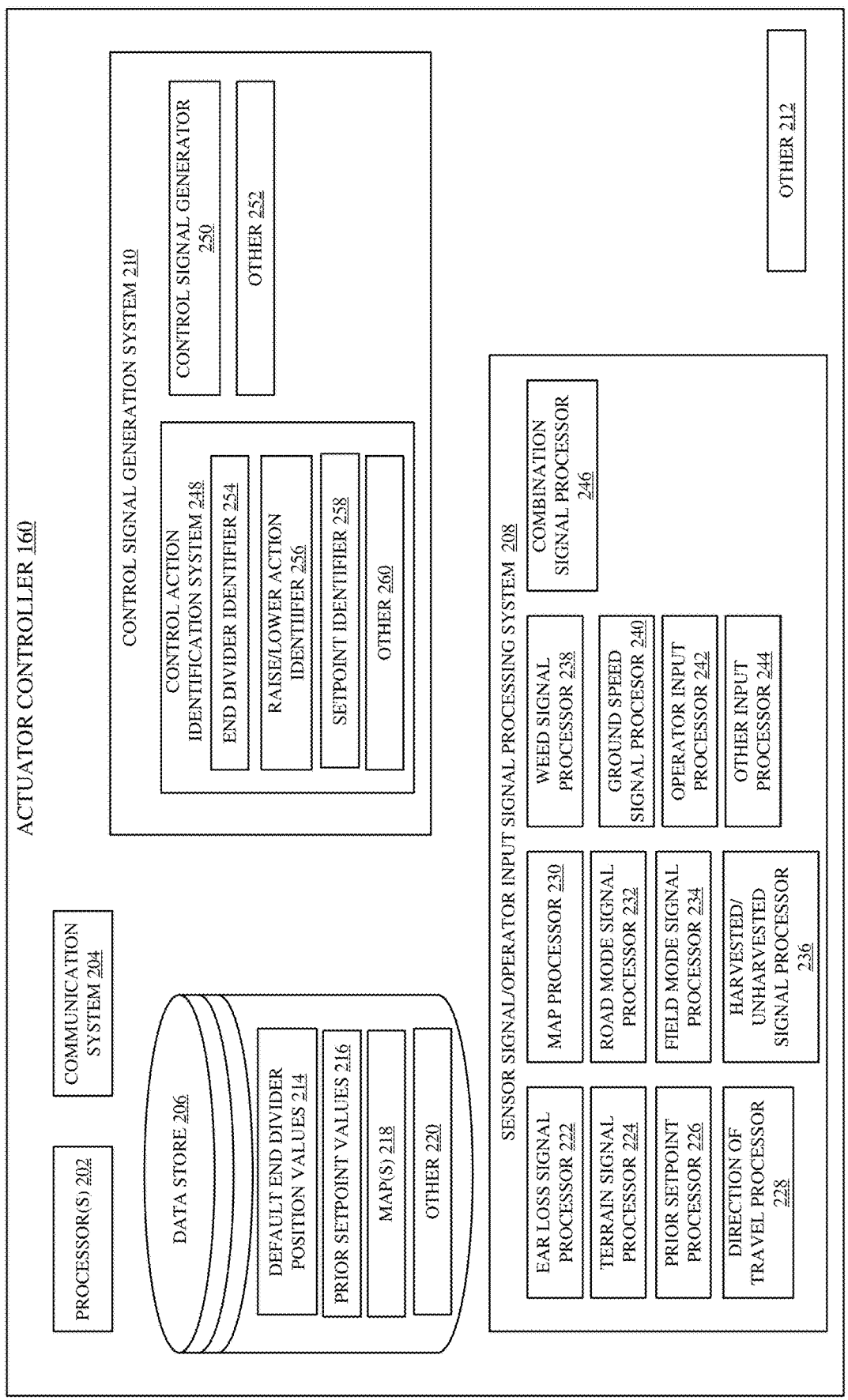
FIG. 5 is a block diagram showing one example of an actuator controller.

FIG. 5 is a block diagram showing one example of actuator controller 160. Actuator controller 160 includes one or more processors 202, communication system 204, data store 206, sensor signal/operator input signal processing system 208, control signal generation system 210, and other items 212.

Before describing actuator controller 160 in more detail, and by way of overview, data store 206 stores maps and data values that can be used by sensor signal/operator input signal processing system 208. Sensor signal/operator input signal processing system 208 receives the signals from sensors 164 and processes the signals to determine a desired position in which the different end dividers 146 and 150 should be positioned. Sensor signal/operator input signal processing system 208 provides an output indicative of the positions of end dividers 146 and 150 to control signal generation system 210. Control signal generation system 210 then generates control signals that are output from actuator controller 160 and transmitted to actuators 158 and 159 to control actuators 158 and 159 to move end dividers 146 and 150 to the desired positions.

Data store 206 includes information that is used by one or more of sensor signal/operator input signal processing system 208 or control signal generation system 210. Therefore, as an example, data store 206 may include default end divider position values 214, prior end divider set point values 216, maps 218, and other items 220.

Sensor signal/operator input signal processing system 208 may include ear loss signal processor 222, terrain signal processor 224, prior set point processor 226, direction of travel processor 228, map processor 230, road mode signal processor 232, field mode signal processor 234, harvested/unharvested signal processor 236, weed signal processor 238, ground speed signal processor 240, operator input processor 242, other input processor 244, and combination signal processor 246. Control signal generation system 210 may include control action identification system 248, control signal generator 250, and other items 252. Control action identification system 248 may include end divider identifier 254, raise/lower action identifier 256, set point identifier 258, and other items 260.

Ear loss signal processor 222 receives a signal from ear loss detector 174 and processes that signal to determine whether ear loss is occurring. Further, if ear loss is occurring, ear loss signal processor 222 determines the location on header 144 where the ear loss is occurring. The ear loss may be occurring over either end or both ends of head 144, for example. When ear loss is detected over one or both ends of the head 144, ear loss signal processor 222 generates a signal commanding one or both of end dividers 146 and 150 to be raised to prevent ear loss at the end of the head 144 where ear loss is detected.

Terrain signal processor 224 receives the signal from terrain detector 176 and determines whether the terrain is sloping, so that one of the ends of header 144 is lower than the other end of header 144. Terrain signal processor 224 also determines whether agricultural harvester 100, 120 is approaching a trench or other terrain feature. If the terrain is sloping so that one of the ends of header 144 is lower than the other end of header 144 or if agricultural harvester 100, 120 is approaching a trench, then terrain signal processor 224 outputs a signal to control signal generation system 210 indicating the direction of slope or the location of the trench so that the position of end dividers 146 and 150 can be controlled to avoid ear loss. Terrain signal processor 224 may also command that one or both end dividers 146 and 150 be raised. For instance, if the terrain slopes so that the left end of header 144 is lower than the right end of header 144, then end divider 146 is raised to avoid ear loss over the left end of header 144. If agricultural harvester 100, 120 is about to traverse a trench, then both end dividers 146 and 150 can be raised to avoid ear loss over both ends of the header 144 while agricultural harvester 100, 120 traverses the trench.

Prior set point processor 226 accesses the prior set point values 216 in data store 206. The prior set point values 216 indicate the position to which end dividers 146 and 150 have been set in the past. The prior set point values 216 are also geo-referenced values to indicate the location of agricultural harvester 100, 120 corresponding to the prior set point value 216. These geo-referenced set point values 216 may be used in automatically controlling the positions of end dividers 146 and 150. For instance, where operator 170 disengages the automatic control of end dividers 146 and 150, and then re-engages the automated control of end dividers 146 and 150, then prior set point processor 226 can obtain the prior set point values 216 for the end dividers 146 and 150 just prior to disengaging the automatic control of the end dividers 146 and 150. Prior set point processor 226 may then generate an output signal to control signal generation system 210 indicating the prior set point values. As a result, the end dividers 146 and 150 can be automatically set to the prior positions.

Direction of travel processor 228 receives a signal from heading detector 178 and identifies the direction of travel of agricultural harvester 100, 120. By way of example, it may be that the operator 170 had controlled the end divider position so that the right end divider 150 was in the raised position while the left end divider 146 was in the retracted position. This may happen, for instance, because the crop to the right of the head 144 has already been harvested while the crop to the left of head 144 has not been harvested, and a raised end divider may dislodge or otherwise separate ears from the unharvested row adjacent the left side of head 144. However, once the agricultural harvester 100, 120 makes a headland turn, then direction of travel processor 228 determines that the agricultural harvester is now heading in the opposite direction from the last pass so that now the left end divider 146 should be moved to its raised position and the right end divider 150 should be moved to its retracted position because now the unharvested crop is to the right of head 144. Direction of travel processor 228 may provide an output indicative of the direction of travel of agricultural harvester 100, 120 and the desired end divider positions based upon the direction of travel.

Map processor 230 may process any maps that are received through map input mechanism 180. Map processor 230 may receive, for instance, a harvest map to determine what portions of the current field are harvested and where those portions lie relative to the current position of agricultural harvester 100, 120 and relative to the direction of travel of agricultural harvester 100, 120. Map processor 230 may determine the location of agricultural harvester 100, 120 relative to the edges of the field, relative to fence lines or tree lines, or relative to other features, such as other features noted on a map. Map processor 230 may process a vegetative index map to identify the location of weed patches. Map processor 230 may process a map to identify whether agricultural harvester 100, 120 is currently located in a field or on a road or located elsewhere. In some implementations, map processor 230 may be used as the road mode detector 182 and generate an output signal indicating that agricultural harvester 100, 120 is located on a road. Map processor 230 may generate an output signal indicative of the features on a map and a commanded end divider position.

Road mode signal processor 232 receives an input from road mode detector 182 and determines whether agricultural harvester 100, 120 is in road mode or is being moved into the road mode from the field mode. Agricultural harvester 100, 120 is in road mode when it is physically configured to travel on the road as opposed to through a field. For instance, if road mode detector 182 detects that the actuators 132 and 138 on a foldable head are being moved from a position in which the head is unfolded to a position in which the head is folded, road mode detector 182 may provide an output indicative of the changing positions of actuators 132 and 138 to road mode signal processor 232. Based upon the signal from road mode detector 182, road mode signal processor 232 may determine that agricultural harvester 100, 120 is being moved to the road mode and provide an output indicating that agricultural harvester 100, 120 is being moved to the road mode and a command to lower the end dividers 146 and 150 to control signal generation system 210.

Field mode signal processor 234 receives an input from field mode detector 184 and determines whether agricultural harvester 100, 120 is in the field mode and generates an output indicating whether agricultural harvester 100, 120 is in the field mode. Agricultural harvester 100, 120 is in field mode when it is physically configured to travel through a field as opposed to on a road. For instance, if field mode detector 184 provides an output indicating that the crop processing systems in agricultural harvester 100, 120 are operating, field mode signal processor 234 may determine that agricultural harvester 100, 120 is in the field mode. Field mode signal processor 234 may then generate an output indicating that agricultural harvester 100, 120 is in field mode and field mode signal processor 234 generates a commanded end divider position so that the end dividers 146, 150 should be raised.

Harvested/unharvested signal processor 236 may receive a signal from adjacent pass crop state detector 186 and determine whether the crop adjacent the sides of head 144 has been harvested or is still unharvested. Based upon the signal from adjacent pass crop state detector 186, harvested/unharvested signal processor 236 may determine, for instance, that the crop on the right side of head 144 has already been harvested, while the crop on the left side of head 144 has not been harvested. Thus, harvested/unharvested signal processor 236 may command the end divider 150 to be raised and end divider 146 to be lowered.

Weed signal processor 238 may receive a signal from weed detector 188 and determine whether weeds are currently being encountered by head 144. Weed signal processor 238 may also determine the intensity of the weeds. For instance, where weed detector 188 is an optical detector and provides an output indicative of the presence of weeds over a pre-defined area, weed signal processor 238 may process that signal to indicate that weeds are present, and that the intensity of the weeds is at a certain intensity level. Weed signal processor 238 may command the end dividers to be lowered to avoid entanglement in heavy weeds or that the end dividers 146 and 150 be moved to another position.

Ground speed signal processor 240 may receive an input signal from ground speed detector 190 indicative of the ground speed of agricultural harvester 100, 120. Ground speed signal processor 240 may process that signal to determine that agricultural harvester 100, 120 is in road mode, and whether the end dividers 146 and 150 should be raised or lowered. Ground speed signal processor 240 may generate an output indicative of the desired position of end dividers 146 and 150 based upon the ground speed.

Operator input processor 242 may receive a signal from operator interface mechanisms 166 indicative of an input from operator 170. Operator input processor 242 may process the operator input to indicate the desired positions of end dividers 146 and 150 based upon the operator input. By way of example, it may be that operator 170 provides an input through operator interface mechanisms 166 commanding that end divider 146 be raised to the fully raised position and commanding end divider 150 to be raised only to a halfway point between the fully retracted position and the fully raised position. Operator input processor 242 may then provide an output indicative of the commanded end divider position based upon the detected operator input. Other input processor 244 may receive inputs from other sensors.

Combination signal processor 246 may receive inputs from a combination of the different sensors 164 and operator interface mechanisms 166 and generate an output indicative of the desired position of end dividers 146 and 150. For instance, combination signal processor 246 may receive an input from geographic position sensor 173 identifying the geographic position of agricultural harvester 100, 120. Combination signal processor 246 may also receive an input from map input mechanism 180 that includes a map of field boundaries with fences. Combination signal processor 246 may also receive an input from heading detector 178 that identifies the heading of agricultural harvester 100, 120. Based upon the location of harvester 100, 120 relative to the fences identified in the map, and based upon the heading of agricultural harvester 100, 120 detected by heading detector 178, combination signal processor 246 may determine that the end divider closest to the fence line should be moved to the retracted position in order to avoid being caught on the fence and thus damaged. Combination signal processor 246 may generate an output indicative of the commanded position of the end divider based upon the combination of inputs.

Once control signal generation system 210 receives one or more inputs from sensor signal/operator input signal processing system 208, control action identification system 248 identifies the control action that is to be taken and control signal generator 250 generates control signals to execute the identified control action. For example, assume that the end divider command from sensor signal/operator input signal processing system 208 indicates that end divider 146 should be moved to the fully retracted position and end divider 150 should be raised to a raised position midway between the retracted position and fully raised position. End divider identifier 254 then identifies which end dividers 146 and 150 is affected by the end divider command from sensor signal/operator input signal processing system 208. In the present example, both end dividers 146 and 150 will be affected by the end divider command. Raise/lower action identifier 256 determines whether the end divider command is to raise or lower a particular end divider, and set point identifier 258 identifies the set point (which may be indicative of the desired end divider position) for the end divider that is to be raised or lowered. Continuing with the present example in which the end divider 150 is to be raised to the midway point between the fully retracted and fully raised positions, end divider identifier 254 identifies the affected end divider as end divider 150. Raise/lower action identifier 256 identifies that the end divider 150 is to be raised and set point identifier 258 identifies, from the end divider command, that the set point for end divider 150 is the midway point between the fully retracted position and the fully raised position. Control action identification system 248 provides an output to control signal generator 250 indicating that end divider 150 is to be raised to the midpoint position. Control signal generator 250 then generates control signals to control actuator 159 to raise end divider 150 to the midpoint position. Position/height sensor 194 may sense the position or height of end divider 150 and provide a feedback signal to control signal generator 250. In another example, control signal generator 250 generates control signals in an open loop fashion in which the set point is commanded, and no feedback is used.

Figure 6:
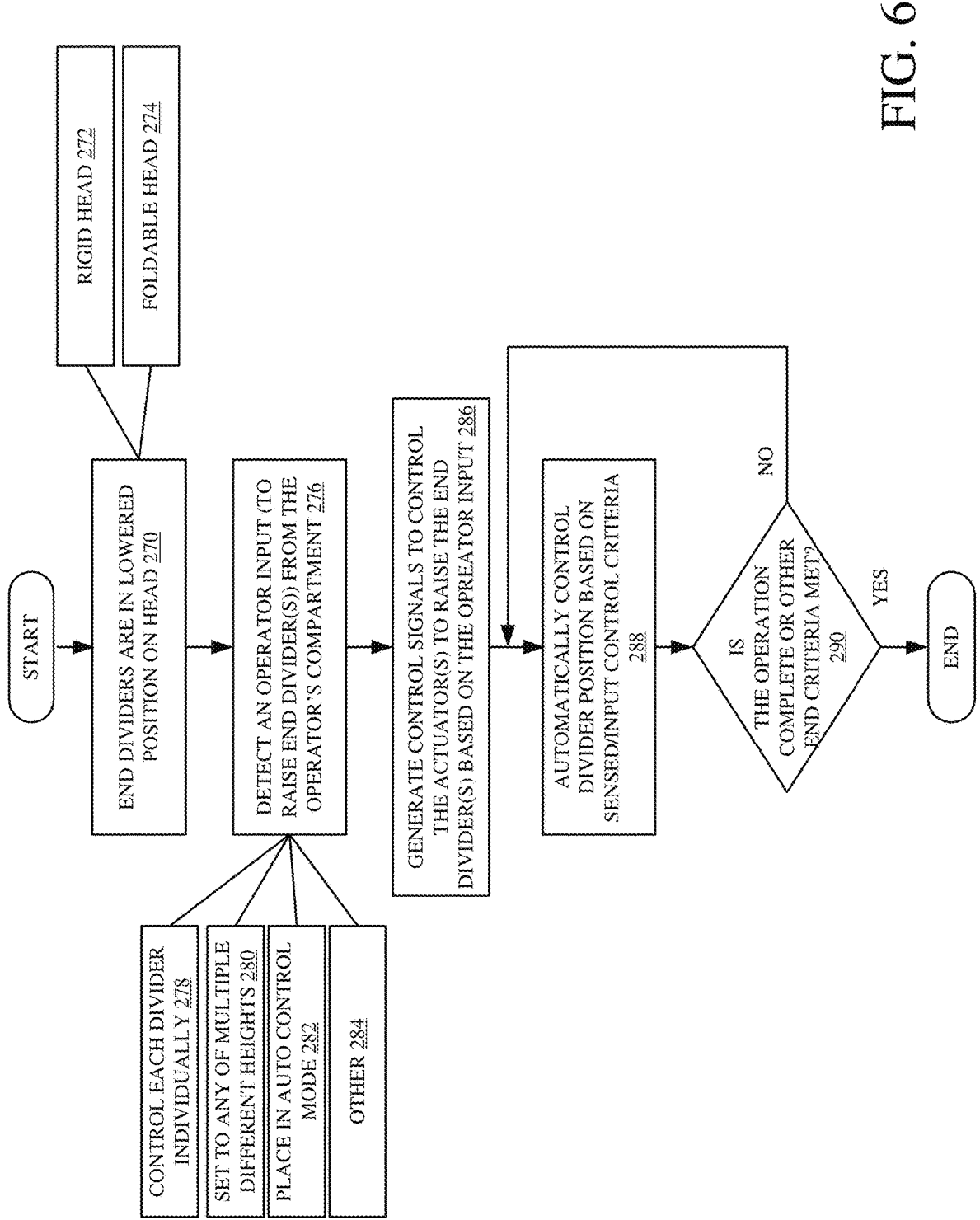
FIG. 6 is a flow diagram illustrating the operation of an agricultural system in controlling end dividers.

FIG. 6 is a flow diagram illustrating one example of the operation of agricultural system 172 in controlling the position of end dividers 146 and 150.

The present description will proceed with respect to head 144, but it will be appreciated that the description could just as easily be applied to head 104 shown in FIG. 1 or head 122 shown in FIG. 2 or to a different head. It is first assumed that end dividers 146 and 150 are in the lowered or retracted position on the head 144. Also, for purposes of the description of FIG. 6, it is assumed that agricultural harvester 100, 120 is just entering a field to begin harvesting in the field. Having the end dividers in the lowered or retracted position on the head 144 is indicated by block 270 in the flow diagram of FIG. 6. The head could be a rigid head, such as head 104 or 144, and as indicated by block 272 in the flow diagram of FIG. 6. The head could also be a foldable head, such as head 122 illustrated in FIG. 2, and as indicated by block 274 in the flow diagram of FIG. 6.

Operator 170 then provides an operator input to raise the end dividers 146, 150. In the example illustrated in FIG. 6, operator 170 provides that input through an operator interface mechanism 166 that is located in the operator compartment 103 of agricultural harvester 100, 120, as indicated by block 276 in the flow diagram of FIG. 6. In one example, the end dividers 146 and 150 can be raised to default positions based on default end divider position values 214 or to other positions.

In one example, the end dividers 146 and 150 are each configured with an actuator 158 and 159, respectively, so that each end dividers 146 and 150 can be controlled individually as indicated by block 278. Block 280 shows that the actuators 158 and 159 can be set to multiple different positions between the fully retracted and fully raised positions so that end dividers 146 and 150 can be set to any of multiple different heights. Block 282 shows that operator 170 can provide an input to actuator controller 160 so that actuator controller 160 is placed in an auto-control mode so that actuator controller 160 automatically controls the height of end dividers 146 and 150 based upon inputs from input mechanism(s) 162. In one example, automatically means that the operation is performed without further operator involvement except, perhaps, to initiate or authorize the operation. Block 284 shows that operator 170 may provide an operator input in other ways, and the operator input may be detected in other ways as well.

Control action identifier system 248 then identifies the end dividers 146 and 150 that are being commanded, and raise/lower action identifier 256 determines that the commanded action is to raise the end dividers 146 and 150. Set point identifier 258 identifies the set point of the command, indicating that particular position of end dividers 146 and 150 relative to their fully retracted or fully raised positions. Block 286 shows that control signal generator 250 then generates control signals to control the actuators 158 and 159 to thereby move end dividers 146 and 150, respectively, to the commanded positions.

Block 288 shows that actuator controller 160 then begins to automatically control the position of end dividers 146 and 150 based upon the inputs from input mechanisms 162. In one example, the automated control of the position of end dividers 146 and 150 can continue until the harvesting operation is complete or until some other end criteria are met, as indicated by block 290 in the flow diagram of FIG. 6.

Figure 7:
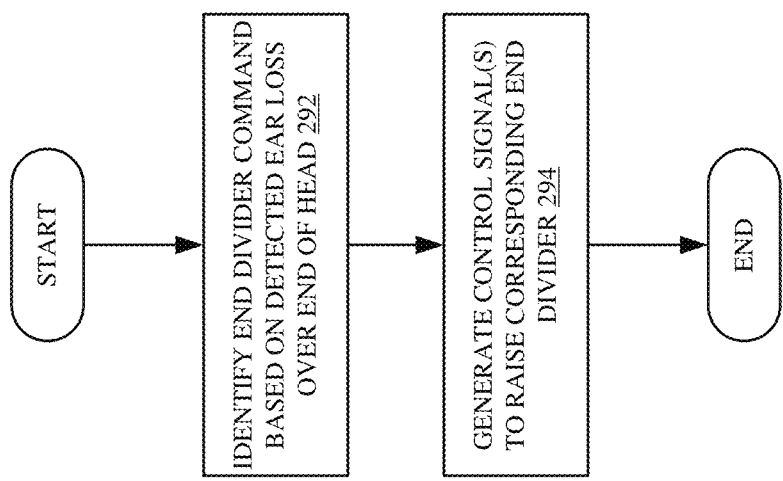
FIGS. 7, 8, 9, 10, 11, 12, 13, 14, 15, 16, 17, 18, and 19 are flow diagrams showing different types of automatic control of end dividers.

FIGS. 7-19 are flow diagrams showing different examples of how actuator controller 160 can automatically control the position of end dividers 146 and 150. In the example shown in FIG. 7, ear loss detector 174 generates a signal indicative of an ear loss over one of the ends of the head 144. Ear loss signal processor 222 processes that signal to generate an end divider command that the end divider on the same side of head 144 where the ear loss occurred should be raised based on the end divider command. Block 292 shows that control action identifier system 248 then identifies which end divider is to be raised. Block 294 shows that control signal generator 250 generates control signals to raise the corresponding end divider.

Figure 8:
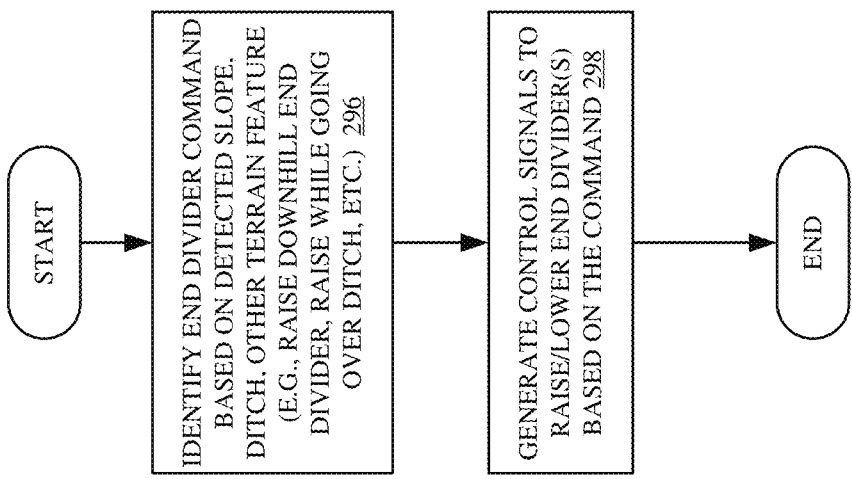

FIG. 8 shows an example in which terrain detector 176 generates a signal indicative of a terrain feature that may be useful in determining whether to raise or lower an end divider. Terrain signal processor 224 processes that signal to detect a slope, ditch, or other terrain and generate an end divider command signal indicating how to command the end dividers based upon the detected terrain. Block 296 shows identifying the end divider command.

Control signal generation system 210 then generates control signals to raise or lower the end dividers based upon the end divider command from terrain signal processor 224. For instance, terrain signal processor 224 may generate an end divider command signal identifying a downhill end divider and a command indicating that the downhill end divider should be raised. In another example, terrain signal processor 224 may also determine that the terrain signal output by terrain detector 176 shows an upcoming ditch. Terrain signal processor 224 may then determine that both end dividers should be raised while the agricultural harvester 100, 120 traverses the ditch and generate an end divider command. Block 298 shows that control signal generator 250 then generates control signals to raise or lower the end dividers based upon the end divider command from terrain signal processor 224 and the action identified by control action identification system 248.

Figure 9:
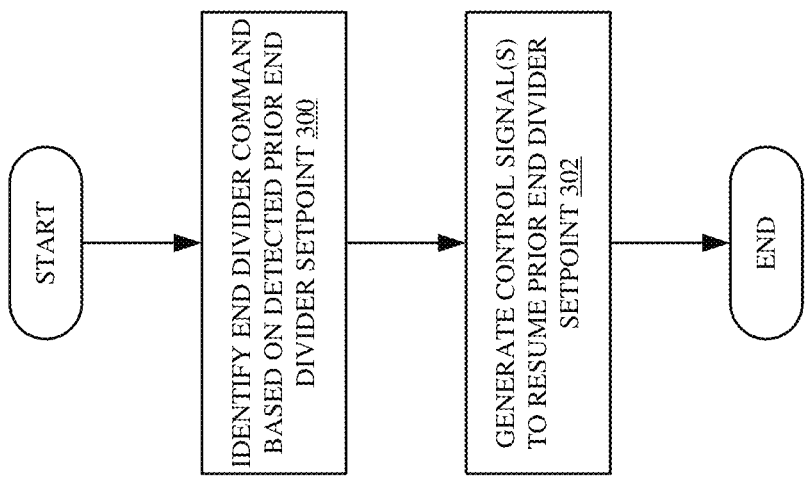

FIG. 9 shows an example in which prior set point processor 226 determines that prior set points should be used for setting the positions of end dividers 146 and 150 and sends a corresponding end divider command. Identifying the end divider command based on prior divider set points is indicated by block 300 and generating control signals to control actuators 158 and 159 to resume the prior positions of end dividers 146 and 150 is indicated by block 302.

Figure 10:
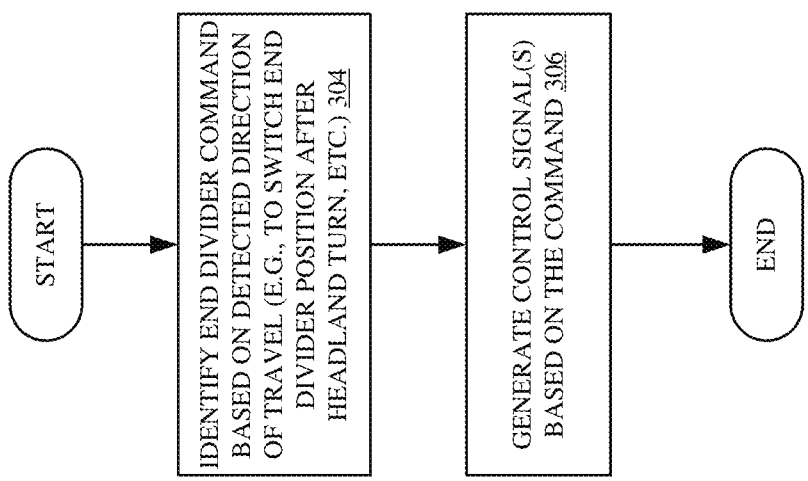

FIG. 10 shows an example in which direction of travel processor 228 receives an input from heading detector 178 indicating the direction of travel of the agricultural harvester 100, 120 and generating an end divider command indicative of how the position of the end dividers 146 and 150 should be controlled based upon the direction of travel. Block 304 shows identifying the end divider command and block 306 shows generating control signals based on the direction of travel. In one example, direction of travel processor 228 may determine that agricultural harvester 100, 120 has just made a headland turn. In that case, it may be that the position of the two end dividers 146 and 150 should be reversed so that the position of the right end divider 150 now assumes the position of the left end divider 146 from the previous pass, while the position of the left end divider 146 assumes the position of the right end divider 150 from the previous pass. This is just one example.

Figure 11:
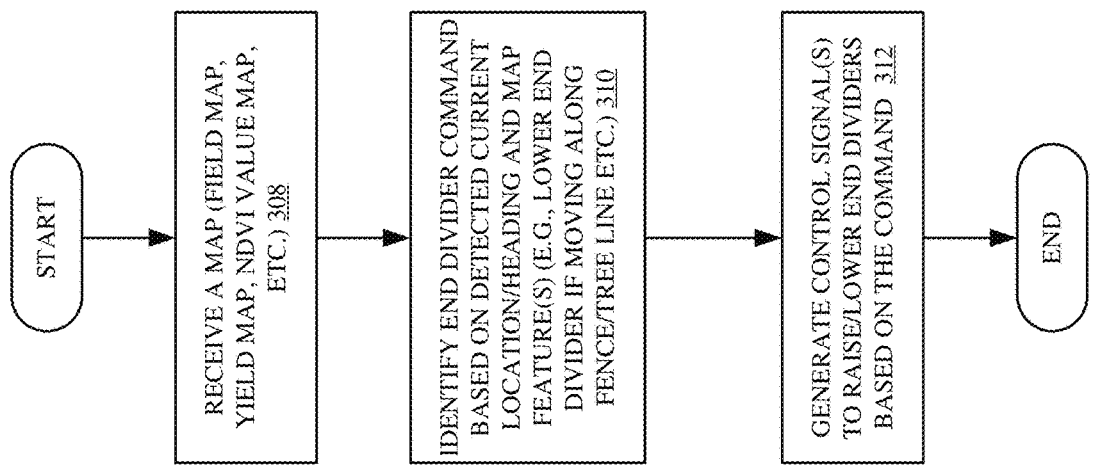

FIG. 11 shows an example in which map input mechanism 180 receives or otherwise inputs a map. The map may be a field map, a yield map, a vegetative index value map, etc. Receiving the map is indicated by block 308 in the flow diagram of FIG. 11. Block 310 shows that map processor 230 may then identify a current position of agricultural harvester 100, 120 from geographic position sensor 173 and also obtain a current heading of agricultural harvester 100, 120 from heading detector 178. Map processor 230 may then generate an output indicating how the end dividers 146 and 150 should be positioned based upon the current location of agricultural harvester 100, 120 and the information in the received map. That output is provided to control signal generation system 210 which generates control signals to control actuators 158 and 159 to drive end dividers 146 and 150 to the desired position. Block 312 shows generating control signals to raise or lower the end dividers 146 and 150 based upon the location and heading of agricultural harvester 100, 120 and the information in the map. For instance, it may be that the end divider that is closely adjacent a fence or tree line needs to be lowered. This is just one example of how to control the end dividers based upon the information in a map.

Figure 12:
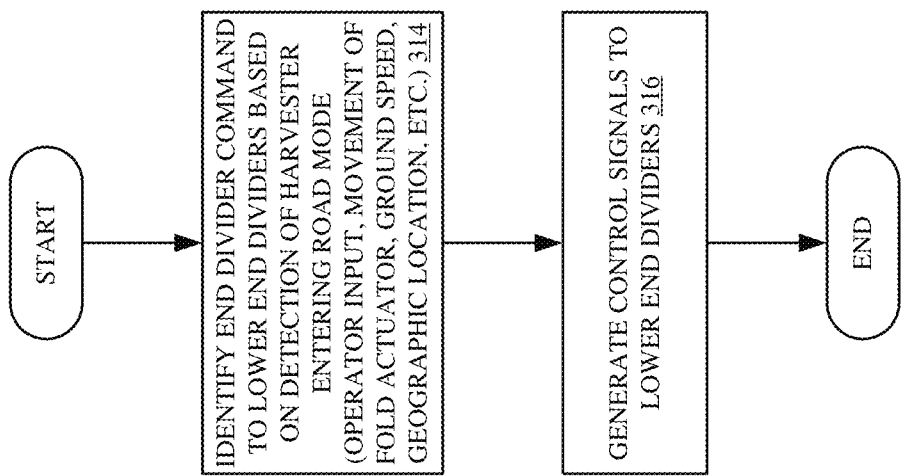

FIG. 12 shows an example in which road mode signal processor 232 detects that agricultural harvester 100, 120 is entering or has entered road mode and generated an end divider command to lower the end dividers 146 and 150. This may be based on one or more of an operator input, movement of the folding actuators 132, 138, the movement of the crop processing functionality in the agricultural harvester 100, 120, the ground speed of the agricultural harvester and the geographic location of the agricultural harvester 100, 120. Block 314 shows identifying the end divider command to lower the end dividers 146 and 150. Block 316 shows that control signal generation system 210 then generates control signals to lower the end dividers based upon the end divider command.

Figure 13:
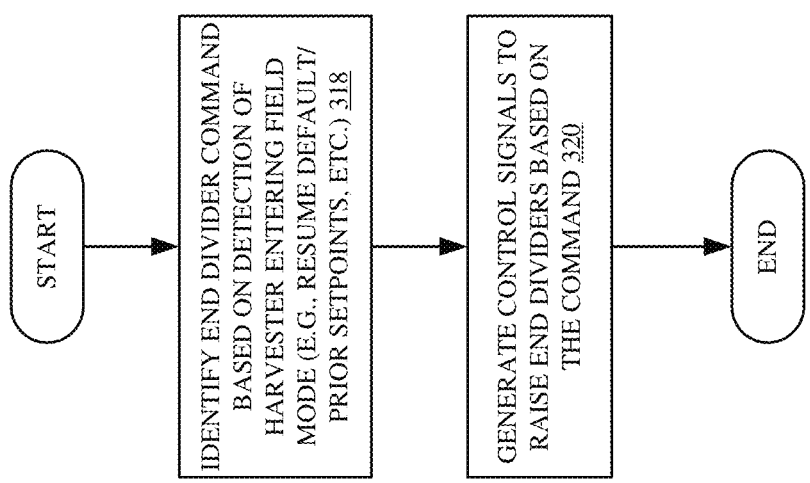

FIG. 13 is an example in which field mode signal processor 234 determines, based upon an input from input mechanism 162, that agricultural harvester 100, 120 is entering or has entered the field mode and generated an end divider command to set the end dividers 146 and 150 to a commanded position. Block 318 shows that control action identification system 248 identifies the end divider command. Also, at block 320 control signal generation system 210 then generates control signals to raise the end dividers (e.g., to resume default or prior set points or raise them to other positions) based on the end divider command.

Figure 14:
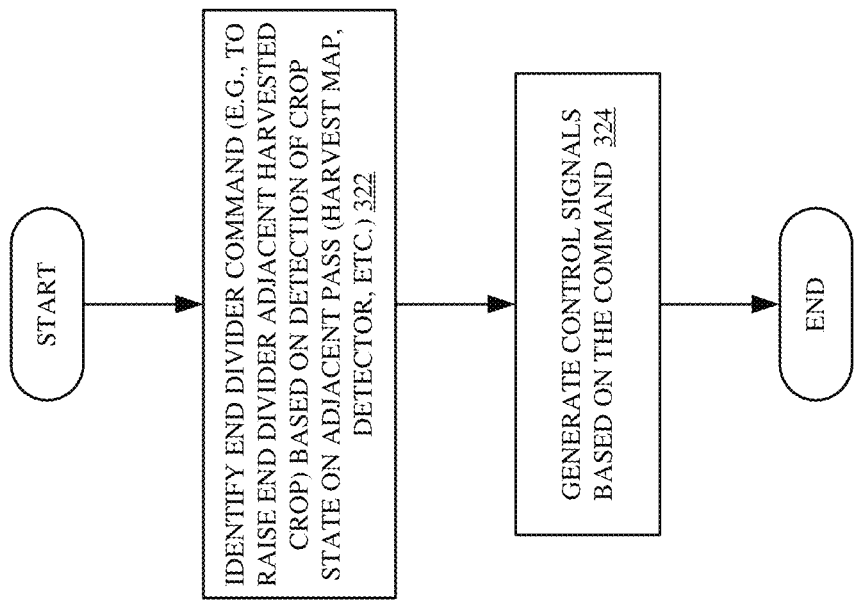

FIG. 14 shows an example in which harvested/unharvested signal processor 236 detects the state (e.g., harvested or unharvested) of the crop adjacent the sides of head 144 and generates an end divider command based on the detected state of the corp. At block 322, control action identification system 248 identifies the end divider command indicating which end dividers should be controlled based upon whether the adjacent crop is harvested or unharvested. At block 324, control signal generator 250 generates control signals to raise the end divider adjacent the harvested crop.

Figure 15:
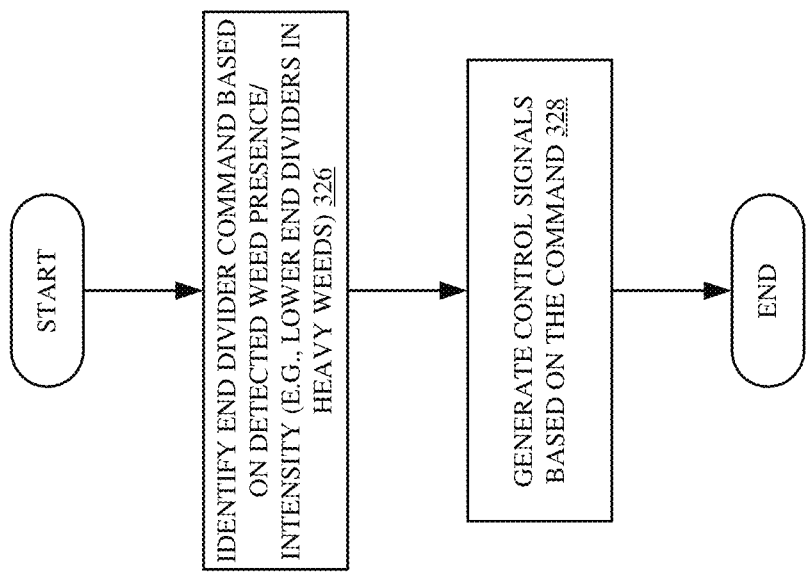

FIG. 15 is a flow diagram indicating an example in which weed signal processor 238 determines that head 144 is encountering a patch of weeds. Weed signal processor 238 then generates an end divider command indicating how to control the end dividers 146 and 150 based upon the detected weed patch. Block 326 shows detecting the weed intensity, and block 328 shows that control signal generator 250 generates control signals based upon the detected weed intensity.

Figure 16:
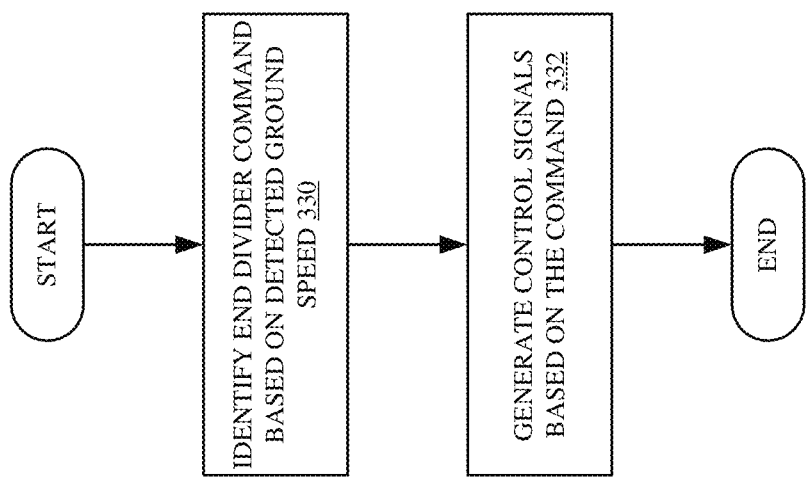

FIG. 16 shows an example in which ground speed signal processor 240 generates an end divider command based on the detected ground speed signal received from ground speed detector 190. At block 330, control action information system 248 identifies the end divider command based on detected ground speed. At block 332, control signal generation system 210 generates control signals based upon the end divider command.

Figure 17:
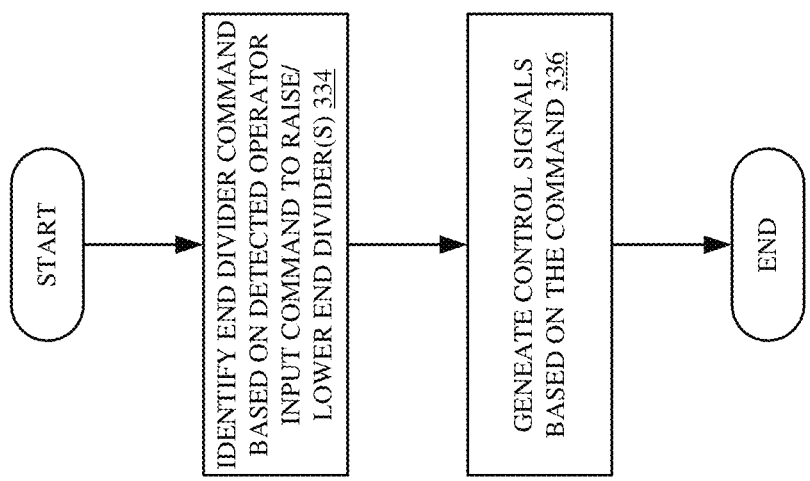

FIG. 17 is a flow diagram illustrating one example in which operator input processor 242 generates an end divider command based on a detected operator input command to raise or lower the end dividers received through operator input mechanisms 166. At block 334, control action identification system 248 identifies the end divider command. At block 336, control signal generation system 210 generates control signals to control the position of actuators 158 and 159 based upon the end divider command.

Figure 18:
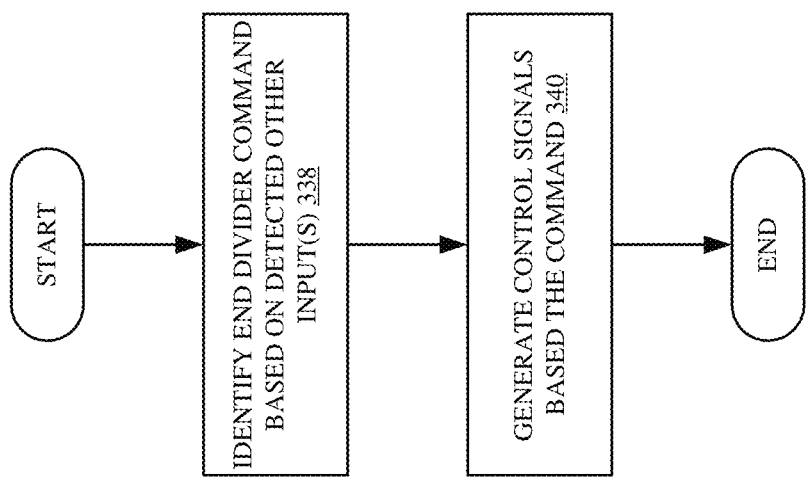

FIG. 18 is a flow diagram illustrating one example in which other input processor 246 generates an end divider command based upon other inputs from other sensors or input mechanisms. At block 338, control action identification system 248 identifies the end divider command. At block 340, control signal generation system 210 then generates control signals based upon the other inputs, as commanded by other input processor 214.

Figure 19:
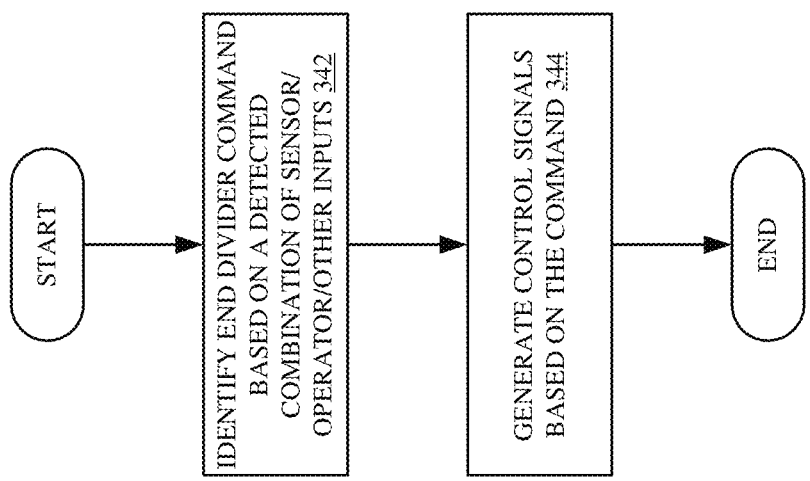

FIG. 19 is a flow diagram illustrating one example in which combination signal processor 246 generates an end divider command based upon a combination of one or more sensor inputs, operator inputs, or other inputs. At block 342 in the flow diagram of FIG. 19, control action identification system 248 identifies the end divider command. At block 344, control signal generation system 210 then generates control signals based upon the commands obtained through the combination of inputs.

It can thus be seen that the present description describes a system in which the end dividers 146 and 150 can be controlled through an operator input from an operator compartment 103 of an agricultural harvester 100, 120. The present description also describes a system in which the position of the end dividers 146 and 150 can be automatically controlled based upon a wide variety of different sensed inputs or operator inputs.

The present discussion has mentioned processors and servers. In one example, the processors and servers include computer processors with associated memory and timing circuitry, not separately shown. The processors or servers are functional parts of the systems or devices to which they belong and are activated by, and facilitate the functionality of, the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can also be actuated in a wide variety of different ways. For instance, they can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 20:
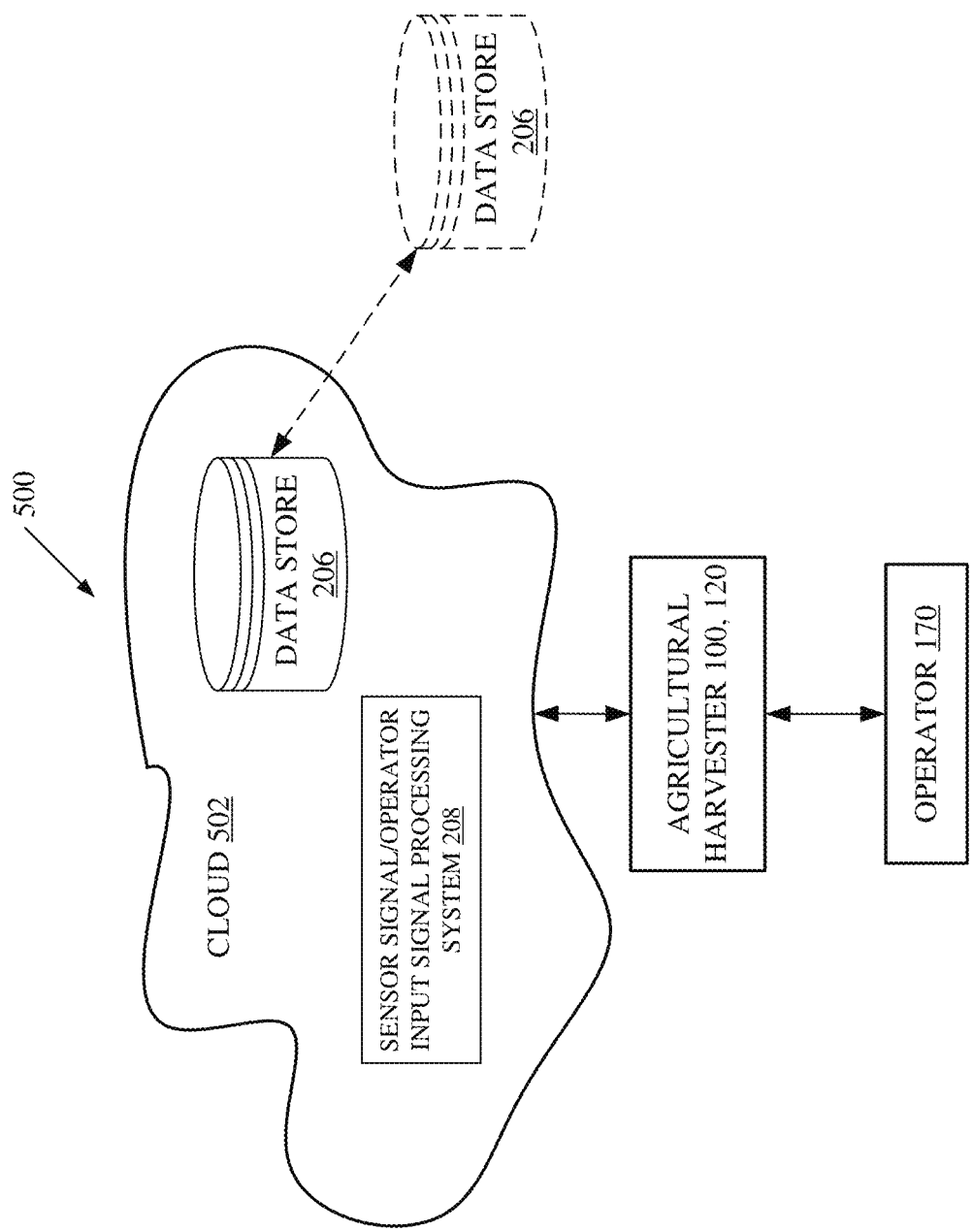
FIG. 20 is a block diagram showing one example of an agricultural system in a remote server environment.

FIG. 20 is a block diagram of harvester 100, 120, shown in FIGS. 1-5, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 20, some items are similar to those shown in FIGS. 1-5 and they are similarly numbered. FIG. 20 specifically shows that sensor signal/operator input signal processing system 208 and data store 206 can be located at a remote server location 502. Therefore, harvester 100, 120 accesses those systems through remote server location 502.

FIG. 20 also depicts another example of a remote server architecture. FIGS. 1-5 shows that some elements of FIG. 1 are disposed at remote server location 502 while others are not. By way of example, data store 206 can be disposed at a location separate from location 502 and can be accessed through the remote server at location 502. Regardless of where the elements of agricultural system 172 are located, the elements of agricultural system 172 can be accessed directly by harvester 100, 120 through a network (either a wide area network or a local area network), the elements can be hosted at a remote site by a service, or the elements can be provided as a service, or the elements can be accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural harvester 100, 120 comes close to the fuel truck for fueling, the system automatically collects the information from the agricultural harvester 100, 120 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural harvester 100, 120 until the agricultural harvester 100, 120 enters a covered location. The agricultural harvester 100, 120, itself, can then send the information to the main network.

It will also be noted that the elements of FIGS. 1-5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 21:
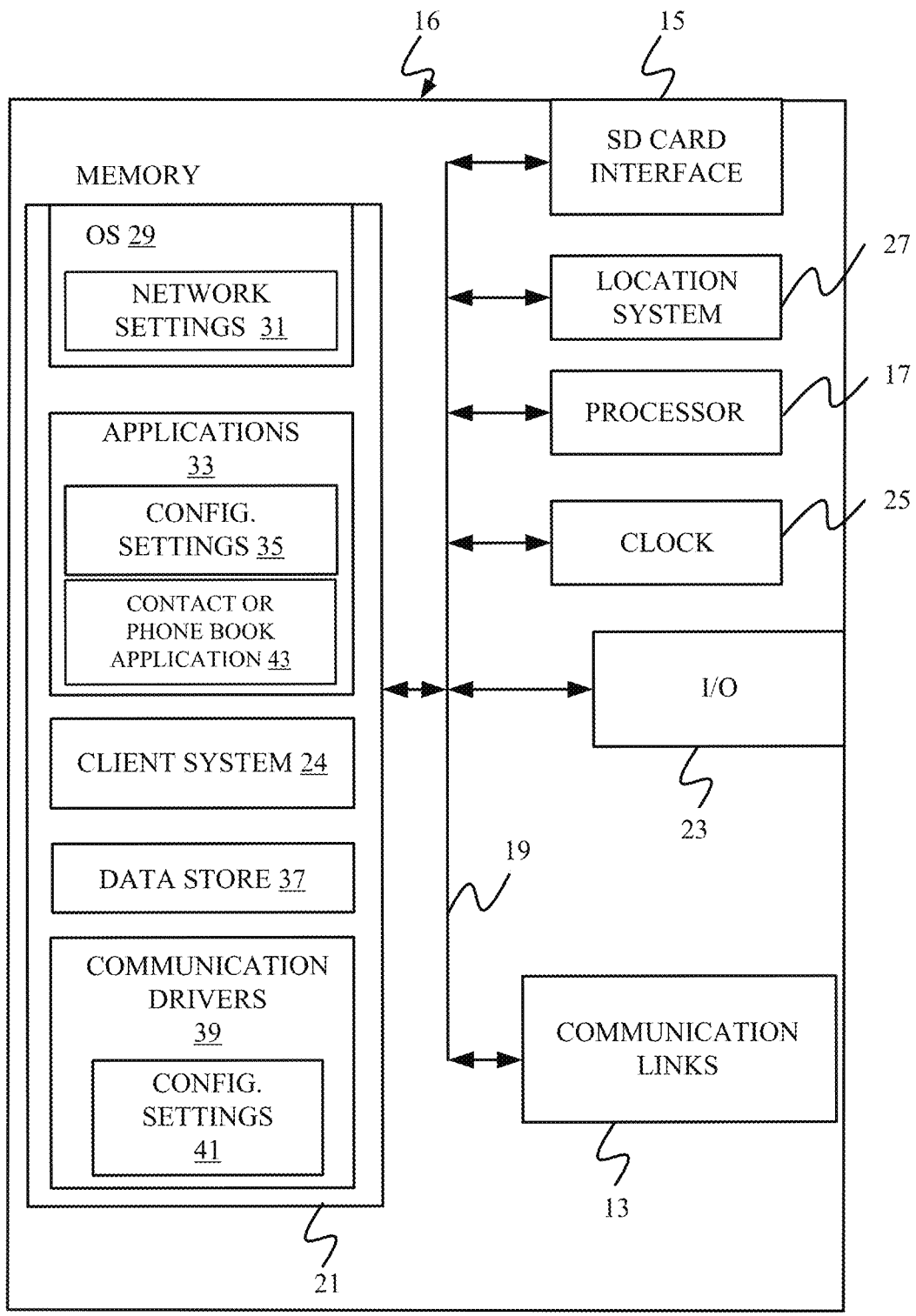
FIGS. 21-23 show examples of mobile devices.
Figure 22:
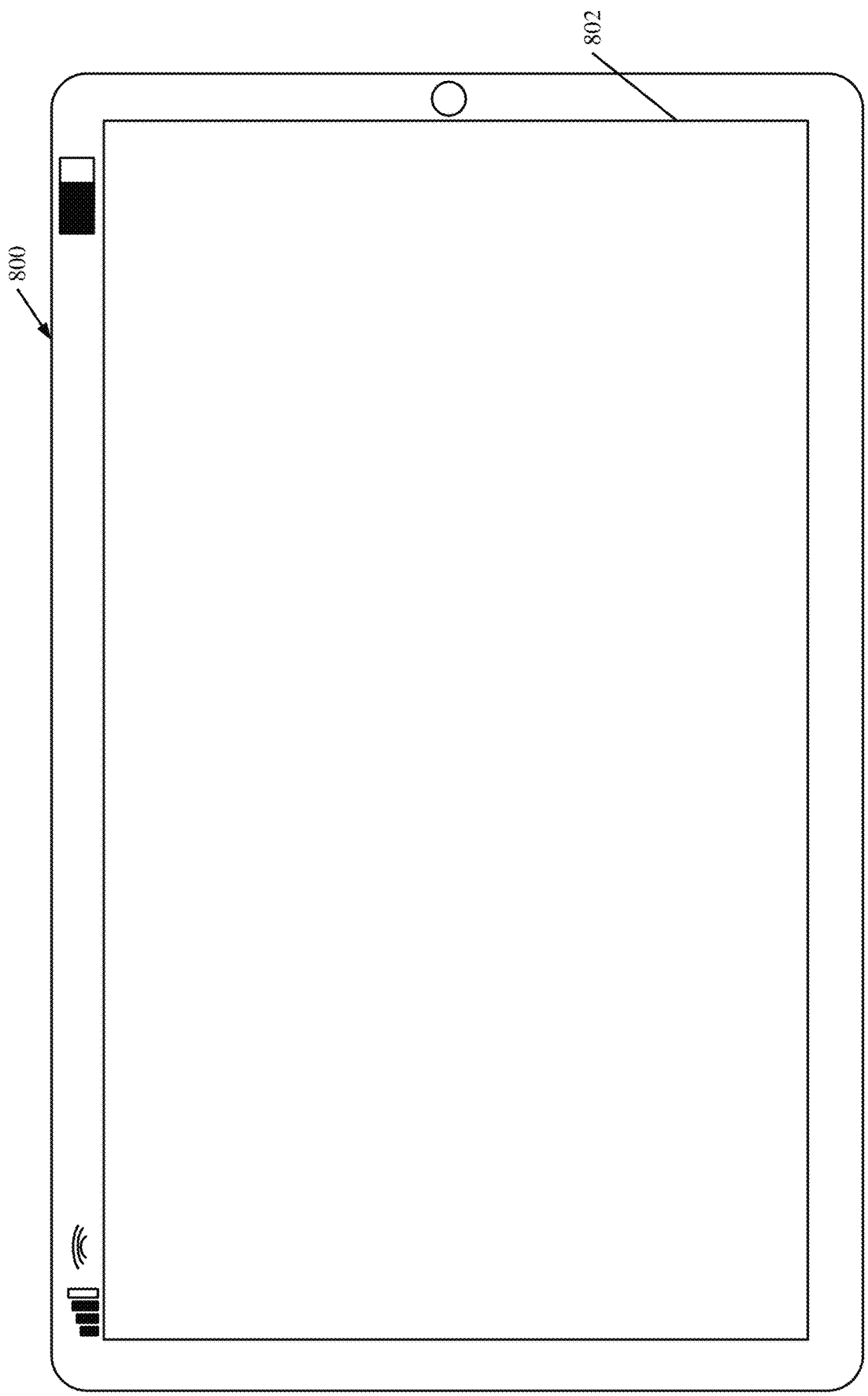
Figure 23:
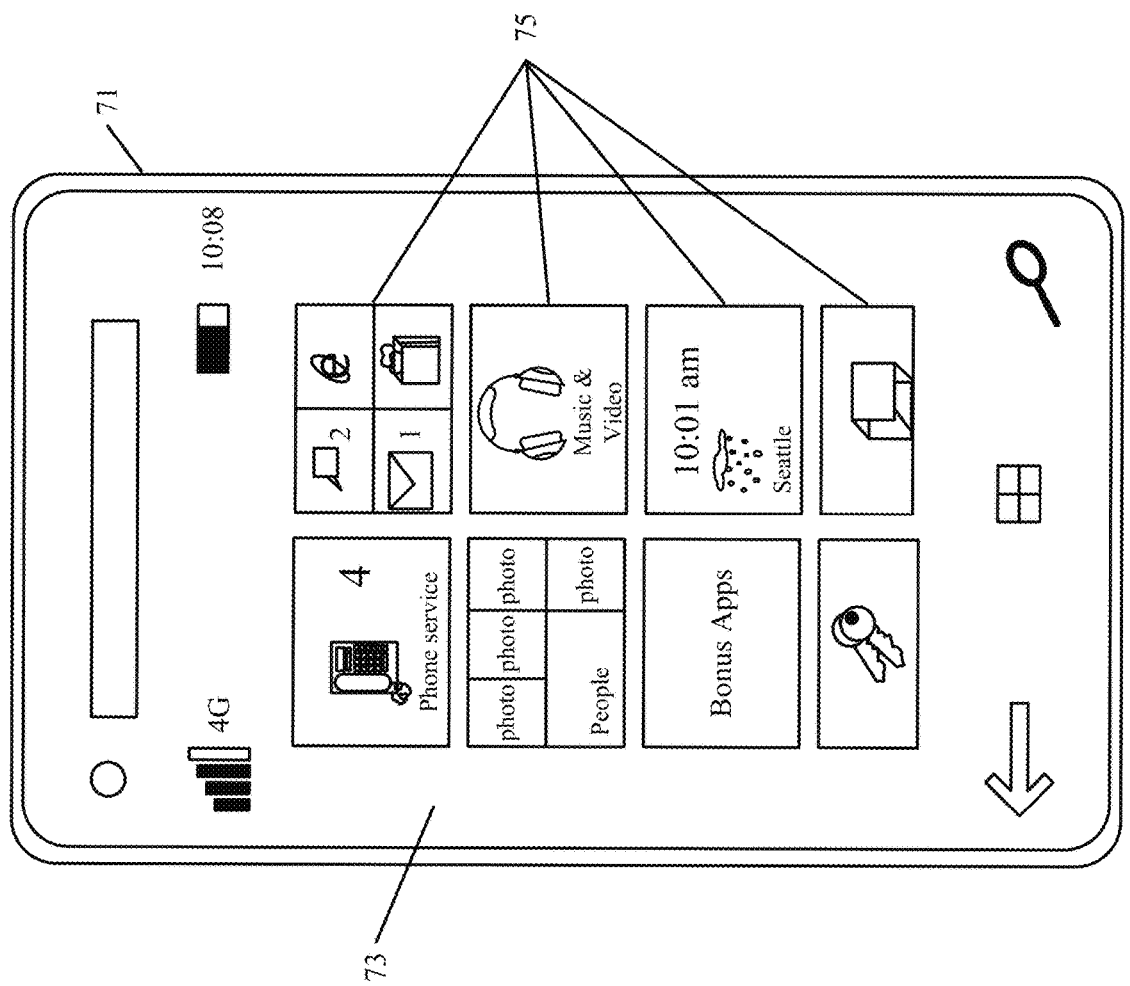

FIG. 21 is a simplified block diagram of one illustrative example of a handheld or mobile computing device that can be used as a user's or client's hand held device 16, in which the present system (or parts of it) can be deployed. For instance, a mobile device can be deployed in the operator compartment 103 of agricultural harvester 100, 120 for use in generating, processing, or displaying the end divider data. FIGS. 22-23 are examples of handheld or mobile devices.

FIG. 21 provides a general block diagram of the components of a client device 16 that can run some components shown in FIGS. 1-5, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Memory 21 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 22 shows one example in which device 16 is a tablet computer 600. In FIG. 22, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 23 is similar to FIG. 22 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 24:
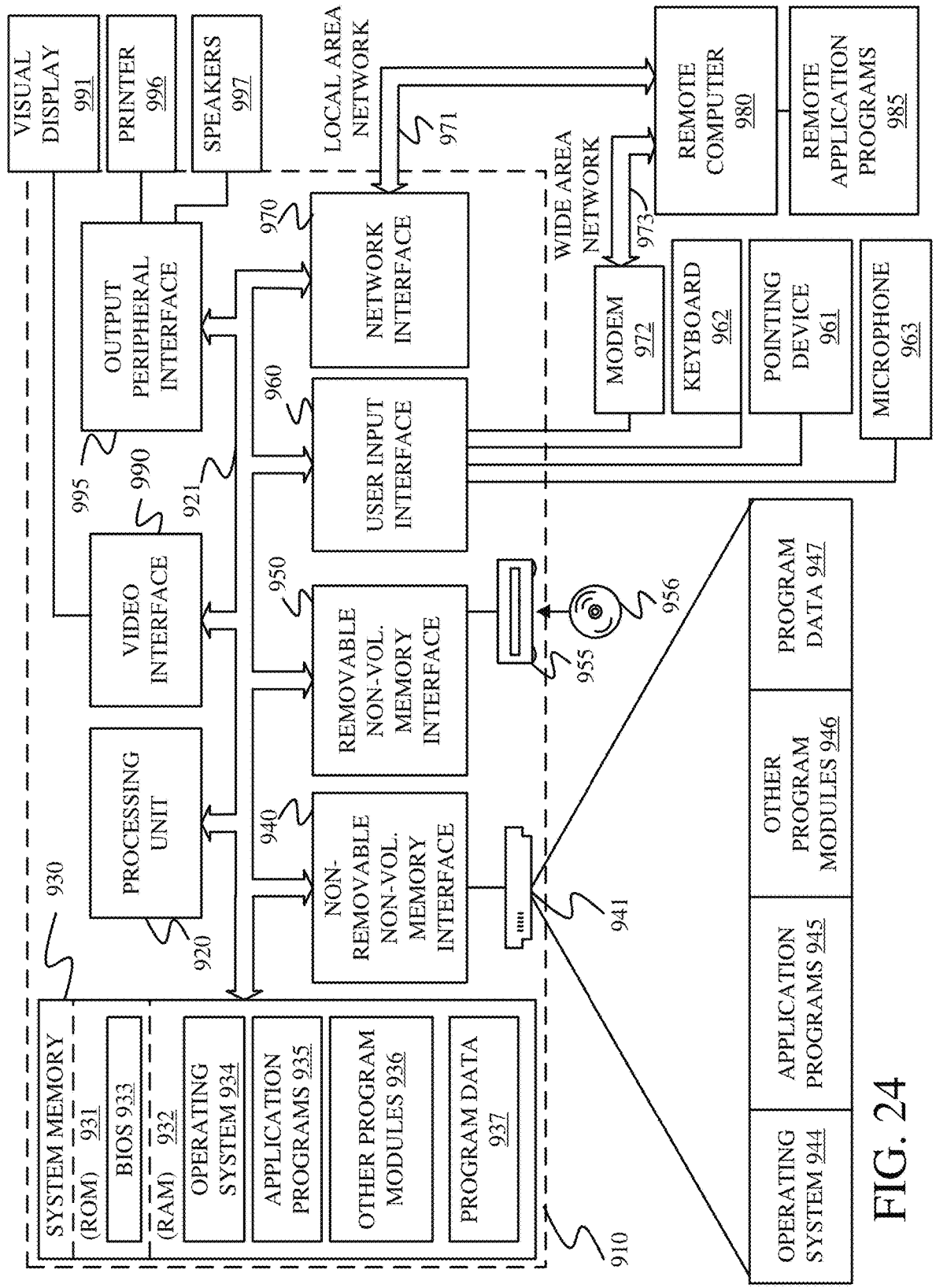
FIG. 24 is a block diagram showing one example of a computing environment.

FIG. 24 is one example of a computing environment in which elements of FIGS. 1-5, or parts of it, (for example) can be deployed. With reference to FIG. 24, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1-5 can be deployed in corresponding portions of FIG. 24.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 24 illustrates operating system 834, application programs 835, other program modules 836, and program data 837.

The computer 810 may also include other removable/non-removable volatile/nonvolatile computer storage media. By way of example only, FIG. 24 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 24, provide storage of computer readable instructions, data structures, program modules and other data for the computer 810. In FIG. 24, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 24 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system comprising:
   a head configured to be mounted to an agricultural harvester;
   a first end divider, movable between a retracted position and a raised position, on a first end of the head;
   a first actuator, mounted on the head, configured to move the first end divider between the retracted position and the raised position;
   a sensor configured to detect an at least one end divider position criterion and generate a criterion signal based on the detected at least one end divider position criterion, wherein the at least one end divider position criterion comprises at least one of: (i) a geographic position of the agricultural harvester and a map feature; (ii) a crop ear lost over the first end of the head; (iii) a terrain feature of terrain proximate the agricultural harvester; (iv) a mode of the agricultural harvester, the mode indicative of whether the agricultural harvester is in a road mode or a field mode; (v) a crop state of crop adjacent to the agricultural harvester, the crop state indicative of whether crop adjacent to the agricultural harvester is harvested or unharvested; or (vi) a direction of travel of the agricultural harvester;
   an actuator controller configured to process the criterion signal to identify a commanded end divider position corresponding to the first end divider; and
   a control signal generation system configured to automatically generate a control signal to control the first actuator to move the first end divider to the identified commanded end divider position corresponding to the first end divider.

2. The agricultural system of claim 1 and further comprising:
   a second end divider, movable between a retracted position and a raised position, on a second end of the head; and
   a second actuator configured to move the second end divider between the retracted position and the raised position, wherein the actuator controller is configured to process the criterion signal to further identify a commanded end divider position corresponding to the second end divider, and
   wherein the control signal generation system is configured to automatically generate a control signal to control the second actuator to move the second end divider to the identified commanded end divider position corresponding to the second end divider.

3. A method of controlling an end divider on a head of an agricultural harvester, the method comprising:
   detecting an at least one end divider position criterion corresponding to a first end divider on a first end of the head, the first end divider movable between a retracted position and a raised position, wherein detecting the at least one end divider position criterion comprises detecting at least one of: (i) a geographic position of the agricultural harvester and a map feature; (ii) a crop ear lost over the first end of the head; (iii) a terrain feature of terrain proximate the agricultural harvester; (iv) a mode of the agricultural harvester, the mode indicative of whether the agricultural harvester is in a road mode or a field mode; (v) a crop state of crop adjacent to the agricultural harvester, the crop state indicative of whether crop adjacent to the agricultural harvester is harvested or unharvested; or (vi) a direction of travel of the agricultural harvester;
   generating a criterion signal based on the detected at least one end divider position criterion;
   processing the criterion signal to identify a commanded end divider position corresponding to the first end divider; and
   automatically generating a control signal to control a first actuator to move the first end divider to the identified commanded end divider position corresponding to the first end divider.

4. An agricultural machine comprising:
   a head configured to be mounted on an agricultural harvester;
   a first end divider, movable between a retracted position and a raised position, on a first end of the head;
   a first actuator, mounted on the head, configured to move the first end divider between the retracted position and the raised position;
   a sensor configured to detect an at least one end divider position criterion and generate a criterion signal based on the detected at least one end divider position criterion, wherein the at least one end divider position criterion comprising at least one of: (i) a geographic position of the agricultural harvester and a map feature; (ii) a crop ear lost over the first end of the head; (iii) a terrain feature of terrain proximate the agricultural harvester; (iv) a mode of the agricultural harvester, the mode indicative of whether the agricultural harvester is in a road mode or a field mode; (v) a crop state of crop adjacent to the agricultural harvester, the crop state indicative of whether crop adjacent to the agricultural harvester is harvested or unharvested; or (vi) a direction of travel of the agricultural harvester; and
   a controller configured to process the criterion signal to identify a commanded end divider position corresponding to the first end divider and to automatically generate a control signal to control the first actuator to move the first end divider to the identified commanded end divider position corresponding to the first end divider.

* * * * *